United States Patent
Stentiford

(10) Patent No.: US 6,934,415 B2
(45) Date of Patent: Aug. 23, 2005

(54) VISUAL ATTENTION SYSTEM

(75) Inventor: Frederick W. M. Stentiford, Woodbridge (GB)

(73) Assignee: British Telecommunications public limited company, London (GB)

(*) Notice: Subject to any disclaimer, the term of this patent is extended or adjusted under 35 U.S.C. 154(b) by 658 days.

(21) Appl. No.: 09/977,263

(22) Filed: Oct. 16, 2001

(65) Prior Publication Data

US 2002/0081033 A1 Jun. 27, 2002

Related U.S. Application Data

(63) Continuation-in-part of application No. PCT/GB01/00504, filed on Feb. 8, 2001, and a continuation-in-part of application No. PCT/GB01/03802, filed on Aug. 22, 2001.

(30) Foreign Application Priority Data

Feb. 17, 2000 (EP) .............................. 00301262
Sep. 8, 2000 (EP) .............................. 00307771

(51) Int. Cl.$^7$ .............................. G06K 9/46; G06K 9/62
(52) U.S. Cl. ...................................... 382/205; 382/219
(58) Field of Search ................................ 382/218, 219, 382/100, 205, 209, 181

(56) References Cited

U.S. PATENT DOCUMENTS

| | | | |
|---|---|---|---|
| 5,113,454 A | | 5/1992 | Marcantonio et al. |
| 5,200,820 A | * | 4/1993 | Gharavi ................. 375/240.12 |
| 5,825,016 A | * | 10/1998 | Nagahata et al. ......... 250/201.8 |
| 6,111,984 A | * | 8/2000 | Fukasawa .................... 382/209 |
| 6,282,317 B1 | * | 8/2001 | Luo et al. ................... 382/203 |

FOREIGN PATENT DOCUMENTS

| | | |
|---|---|---|
| EP | 1126411 A1 | 8/2001 |
| WO | WO 99/05639 | 2/1999 |

OTHER PUBLICATIONS

Walker et al. "Locating Salient Facial Features Using Image Invariants." Proc. 3$^{rd}$ IEEE Int. Conf. on Automatic Face and Gesture Recognition, Apr. 14, 1998, pp. 242–247.*
Mahlmeister et al. "Sample–Guided Progressive Image Coding." Proc. 14$^{th}$ Int. Conf. on Pattern Recognition, vol. 2, Aug. 16, 1998, pp. 1257–1259.*

(Continued)

Primary Examiner—Jon Chang
(74) Attorney, Agent, or Firm—Nixon & Vanderhye P.C.

(57) ABSTRACT

The most significant features in visual scenes, is identified without prior training, by measuring the difficulty in finding similarities between neighbourhoods in the scene. Pixels in an area that is similar to much of the rest of the scene score low measures of visual attention. On the other hand a region that possesses many dissimilarities with other parts of the image will attract a high measure of visual attention. A trial and error process is used to find dissimilarities between parts of the image and does not require prior knowledge of the nature of the anomalies that may be present. The use of processing dependencies between pixels avoided while yet providing a straightforward parallel implementation for each pixel. Such techniques are of wide application in searching for anomalous patterns in health screening, quality control processes and in analysis of visual ergonomics for assessing the visibility of signs and advertisements. A measure of significant features can be provided to an image processor in order to provide variable rate image compression.

24 Claims, 12 Drawing Sheets

OTHER PUBLICATIONS

Osberger et al. "Automatic Identification of Perceptually Important Regions in an Image." Proc. 14th Int. on Conf. Pattern Recognition, vol. 2, Aug. 16, 1998, pp. 701–704.*

Gallet et al. "A Model of the Visual Attention to Speed Up Image Analysis." Proc. Int. Conf. on Image Processing, vol. 1, Oct. 4, 1998, pp. 246–250.*

Itti et al. "A Model of Saliency–Based Visual Attention for Rapid Scene Analysis." IEEE Trans. on Pattern Analysis and Machine Intelligence, vol. 20, no. 11, Nov. 1998, pp. 1254–1259.*

Privitera et al. "Algorithms for Defining Visual Regions-of-Interest: Comparison with Eye Fixations." IEEE Trans. on Pattern Analysis and Machine Intelligence, vol. 22, no. 9, Sep. 2000, pp. 970–982.*

Ouerhani et al. "Adaptive Color Image Compression Based on Visual Attention." Proc. 11$^{th}$ Int. Conf. on Image Analysis and Processing, Sep. 26, 2001, pp. 416–421.*

Stentiford, "An Estimator for Visual Attention Through Competitive Novelty with Application to Image Compression", Picture Coding Symposium, Seoul, Apr. 24–27, 2001.

Stentiford, "An Evolutionary Programming Approach to the Simulation of Visual Attention", Congress on Evolutionary Computation, Seoul, May 27–30, 2001.

Wixson, "Detecting Salient Motion by Accumulating Directionally–Consistent Flow", IEEE Transactions on Pattern Analysis and Machine Intelligence, IEEE Inc. New York, US, vol. 22, No. 8, Aug. 2002, pp. 774–780.

Wang et al., "Efficient Method for Multiscale Samll Target Detection from a Natural Scene", Optical Engineering, US, Soc. of Photo–Optical Instrumentation Engineers, Bellingham, vol. 35, No. 3, Mar. 1, 1996, pp. 761–768.

Stentiford et al., "An Evolutionary Approach to the Concept of Randomness", The Computer Journal, pp. 148–151, vol. 16, Issue 2.

Stentiford, http://www.ee.ucl.ac.uk/~fstentif/ Dec. 21, 2004.

Stentiford, "Evolution:The Best Possible Search Algorithm?", Dec. 21, 2004, http://more.btexact.com/millennium_issue/vol18no1/today/papers/f_stentiford/authors.htm.

* cited by examiner

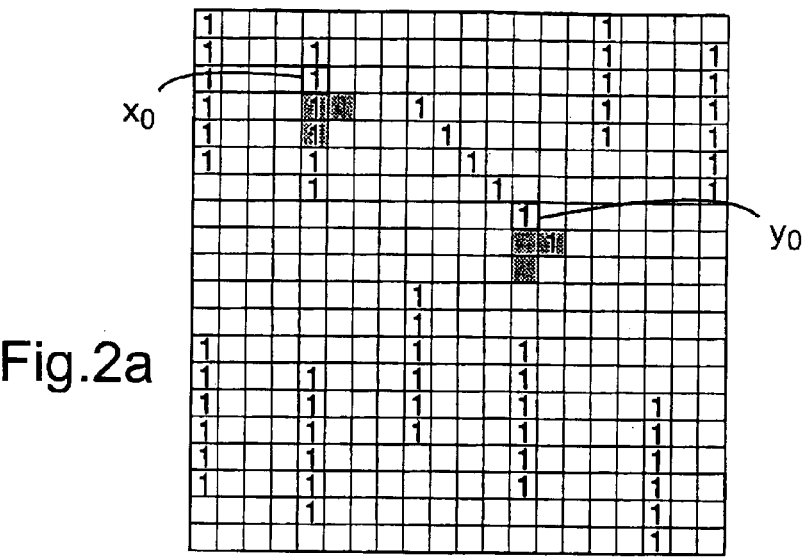
Fig.2a
Fig.2b
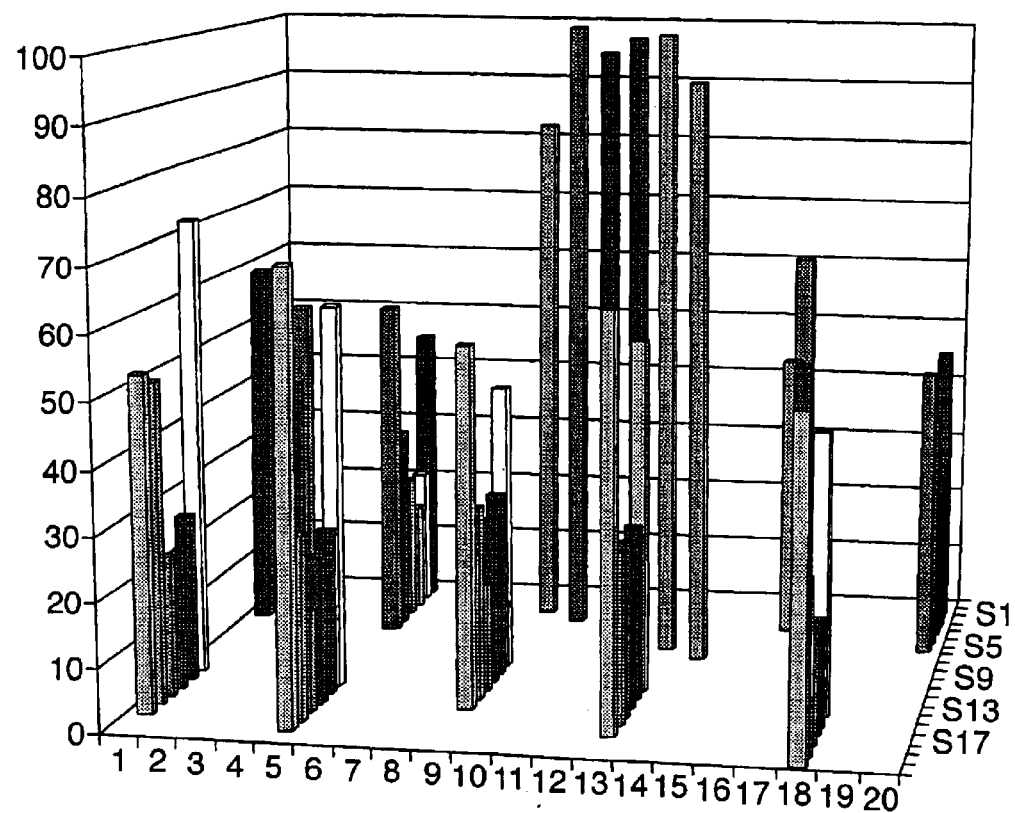

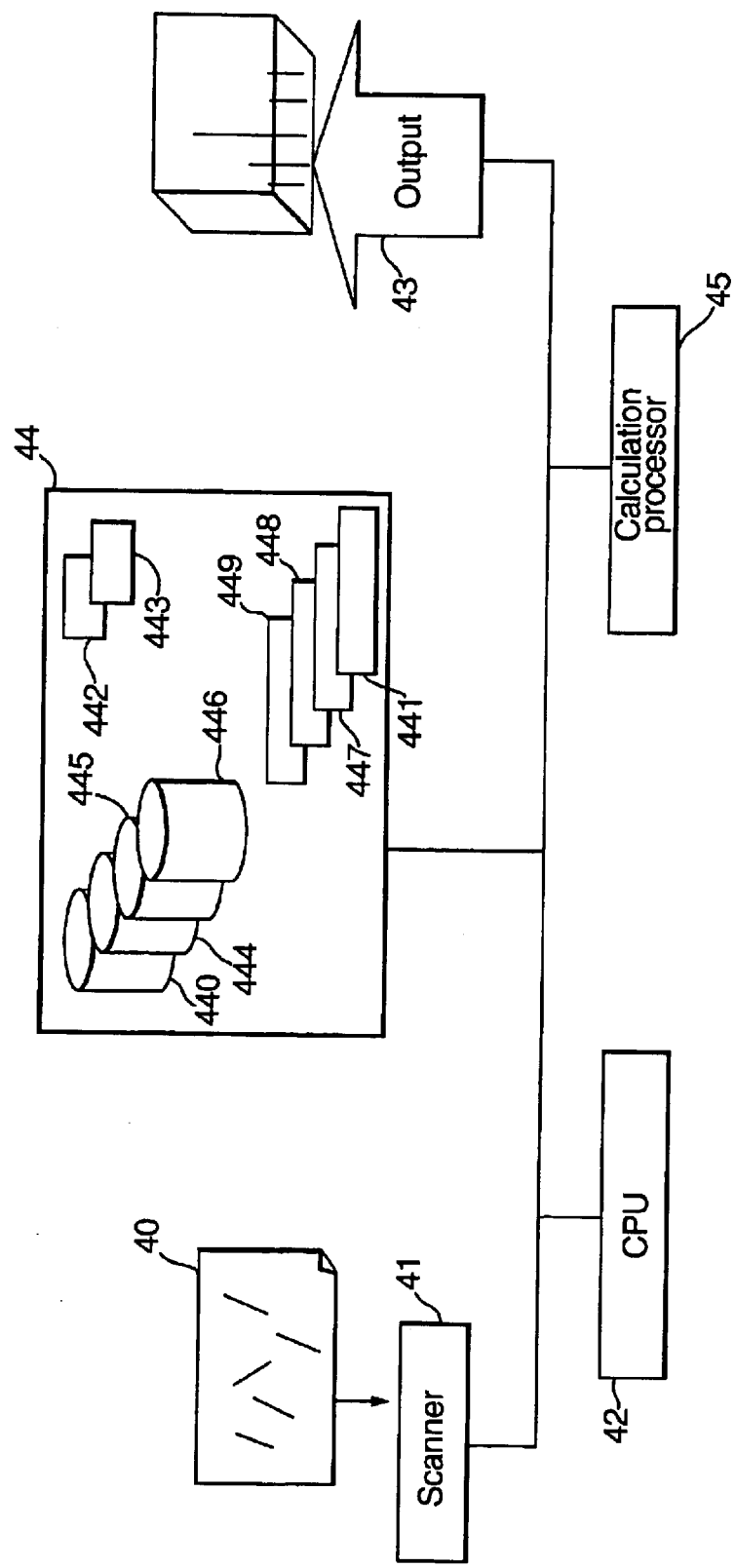

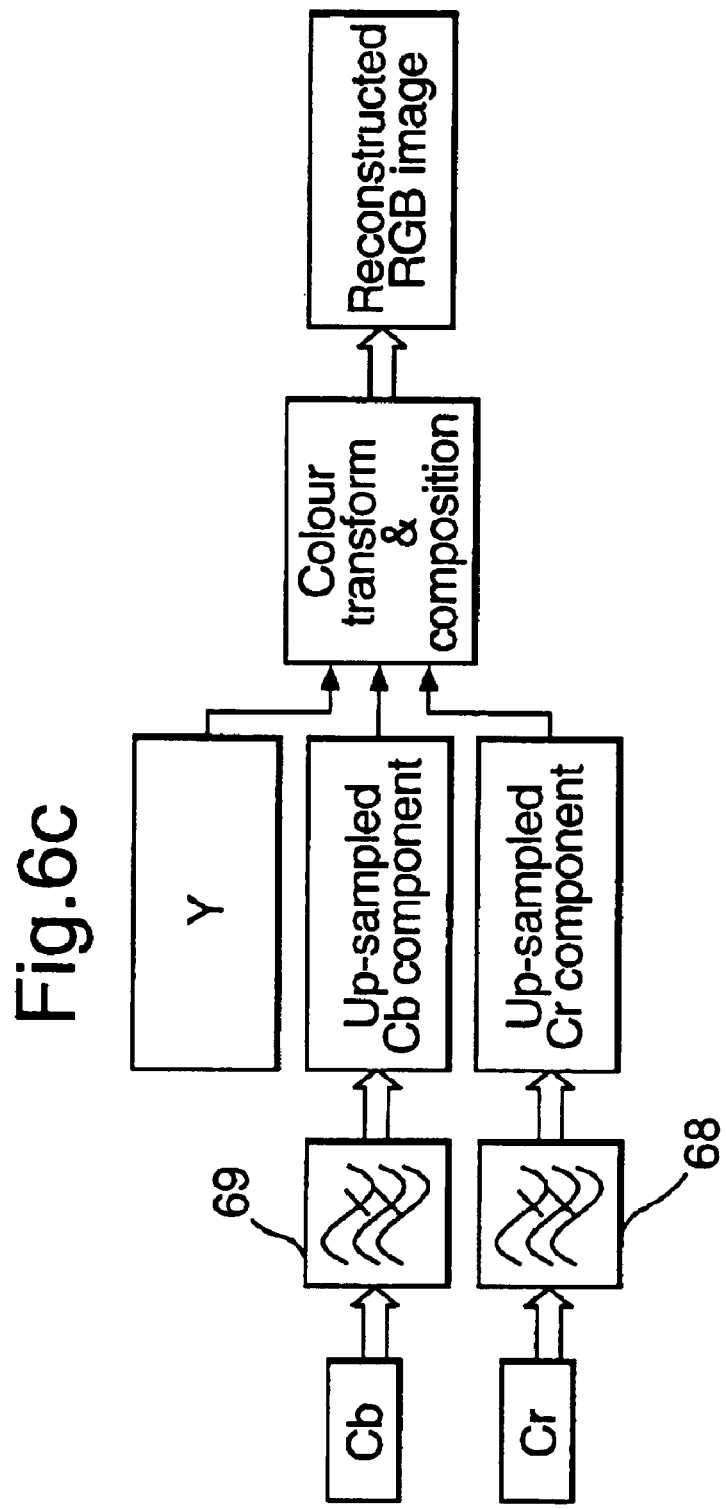

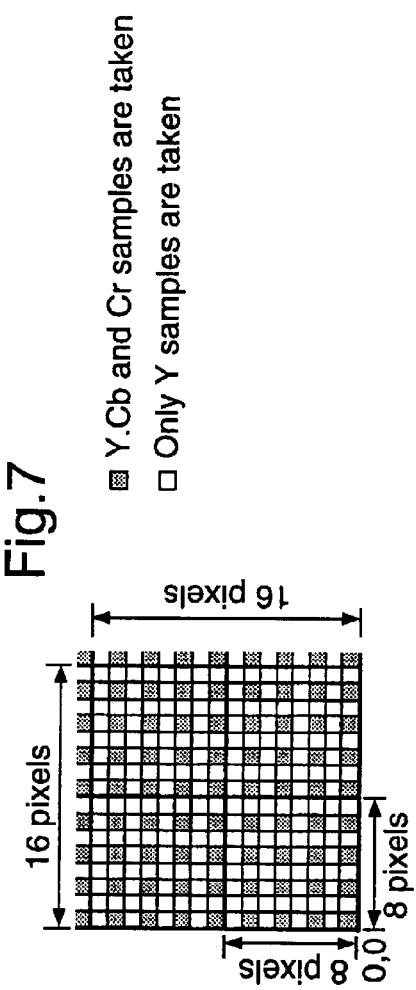
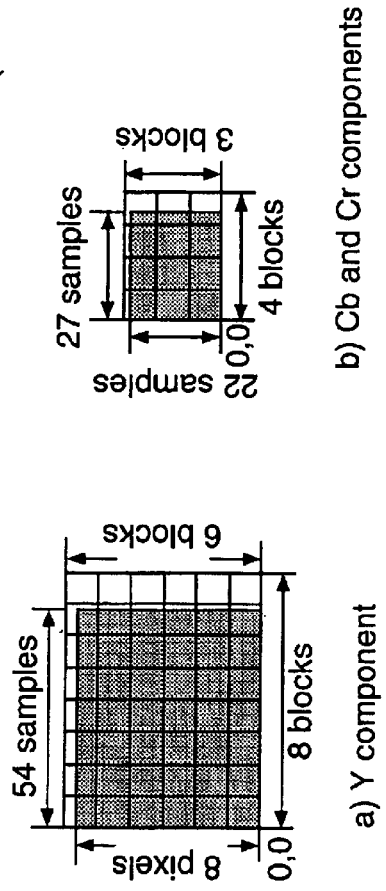

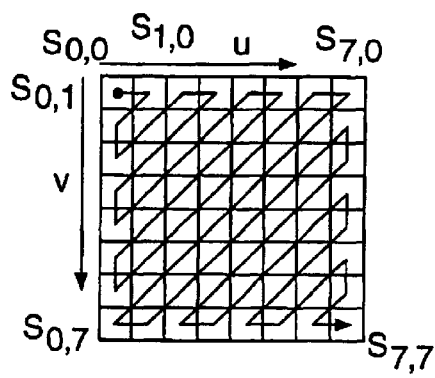
Fig.9
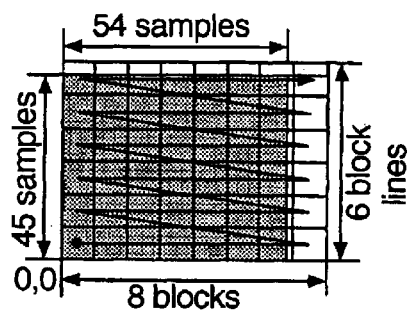
Fig.10
Fig.11
FIG.12
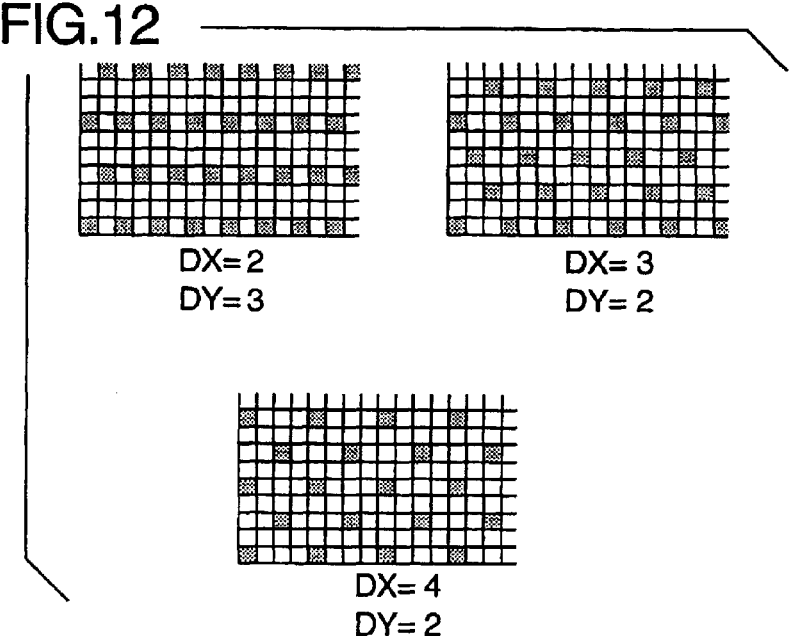

VISUAL ATTENTION SYSTEM

CROSS REFERENCE TO RELATED APPLICATIONS

This application is a continuation-in-part of my prior co-pending applications PCT/GB01/00504 filed Feb. 8, 2001 and PCT/GB01/03802 filed Aug. 22, 2001.

BACKGROUND OF THE INVENTION

1. Field of the Invention

This invention relates to a system for locating salient objects or features contained within a pattern, particulary, though not exclusively, in a static image or a video sequence. The invention also includes an image compression system.

2. Related Art

The human visual eye-brain perceptual system is very good at identifying the most important features of a scene with which it is presented, or the identification of objects that are different in some respect from the background or surrounding population, without the prior training required of most automated systems. However, there are some applications where automation is desirable, for example where the work is very repetitive and the volume of data is very large. A particular example is the inspection of medical smear samples in order to identify cancerous cells. In such situations, where a large number of samples have to be inspected and anomalies are rare, a human observer may become inattentive, and overlook the very feature being searched for.

A system that automatically identifies distinctive objects in an image would also be desirable for many other purposes, for example the identification of the location of the principal subject in a visual scene, the design and location of information signs, and as a substitute for lengthy and expensive human factors trials of visual display equipment.

Existing systems for gauging visual attention extract previously specified features (e.g. colour, intensity, orientation) from images, and then train classifiers (e.g. neural networks) to identify areas of high attention. These trainable models rely heavily on the selection of the features to be searched for in the image, and have no way of handling new visual material that has little similarity with that used to design and test the system. Paradoxically, a feature may simply be too anomalous to be identified as such by a trained system. Such systems also require considerable computational resource in order to process the pre-selected features and moreover this burden increases without limit as the scope of the procedure is extended and more features are added.

The majority of known image compression systems have the disadvantage that they can only compress images with a constant compression rate and thus constant compression quality. Known variable rate compression systems cannot automatically vary the compression rate according to the regions of interest in the image. In most cases, it would be sufficient to compress only regions of interest with high quality while compressing the rest of the image (such as the background) with low quality only. As compression quality and image file size are dependent upon each other, this would reduce the total amount of space required for the compressed image file. One of the techniques used by professional Web designers is to simply blur the background of images before compressing them with JPEG. This forces the background to be made up of continuous tones thus reducing the amount of high spatial frequencies in the image. Images that are pre-processed that way can have their storage requirements reduced by up to 30% depending on the amount of blurring compared to non-blurred images. Blurring images by hand is very labour intensive and depending on the image it might not save enough space to be worth doing.

Joint Picture Experts Group is working on a new image compression standard, JPEG 2000, which also allows specifying regions of interest in images to compress them with higher quality than the rest of the image. However, automatic identification of regions of interest is still a problem.

BRIEF SUMMARY

According to one aspect of the invention there is provided a method of processing a visual image, for identifying areas of visual attention, comprising the steps of:

storing an image as an array of pixels, each pixel having a value;

selecting test pixels from the array, for each test pixel, selecting one or more neighbour groups of pixels neighbouring the test pixel;

selecting comparison pixels from the array;

identifying a group of pixels neighbouring a selected comparison pixel having the same respective positional relationships to the comparison pixel as a selected neighbour group of pixels has to the test pixel;

comparing the values of the selected neighbour group with the values of the identified group in accordance with a predetermined match criterion, and generating a measure of visual attention for each test pixel, in dependence upon the number of comparisons made for that test pixel for which the comparison results in a mismatch.

The method may also be applied to a sequence of images.

In a preferred arrangement, for each test pixel, if one or more of the selected pixels neighbouring the test pixel has an intensity value not substantially similar to the corresponding pixel neighbouring the comparison pixel, an anomaly value is incremented, the process is repeated using further comparison pixels with the same test pixel until a comparison pixel is selected for which all the selected pixels have an intensity value substantially similar to the corresponding pixel neighbouring the test pixel, in which case a further neighbour group is selected and the process repeated.

It has been found that the process operates most efficiently if neighbour pixel groups which have previously generated high anomaly values are selected for analysis of subsequent test pixels. Preferably, therefore, the process includes the steps of storing neighbour group patterns for which a high anomaly value has been generated, and selecting, for subsequent test pixels, a neighbour group having the same respective positional relationships to the subsequent test pixel as the stored neighbour group.

According to another aspect of the invention, there is provided apparatus for processing a visual image, for locating areas of visual attention, comprising means for storing an image as an array of pixels, each pixel having a value;

means for selecting test pixels from the array, means for selecting neighbour groups of pixels neighbouring the test pixel;

means for selecting comparison pixels from the array;

means for identifying that group of pixels neighbouring a selected comparison pixel which has the same respective positional relationships to the comparison pixel as a selected neighbour group of pixels has to the test pixel;

means for comparing the values of the selected neighbour group with the values of the identified group in accordance with a predetermined match criterion, means for generating a measure of visual attention for each test pixel, in dependence upon the number of comparisons which identify a non-matching group.

This apparatus is preferably embodied as a general purpose computer, suitably programmed.

The invention also extends to a computer programmed to perform the method of the invention, and to a computer program product directly loadable into the internal memory of a digital computer, comprising software code portions for performing the steps specified above.

According to another aspect, the invention provides a computer program product stored on a computer usable medium, comprising:

computer-readable program means for causing a computer to store an image as an array of pixels, each pixel having a value;

computer readable program means for causing the computer to select test pixels from the array, computer readable program means for causing the computer to select, for each test pixel, neighbour groups of pixels neighbouring the test pixel;

computer readable program means for causing the computer to select comparison pixels from the array;

computer readable program means for causing the computer to identify the group of pixels neighbouring a selected comparison pixel having the same respective positional relationships to the comparison pixel as a selected neighbour group of pixels has to the test pixel;

computer readable program means for causing the computer to compare the values of the selected neighbour group with the values of the identified group in accordance with a predetermined match criterion, computer readable program means for causing the computer to generate a measure of visual attention for each test pixel, in dependence upon the number of comparisons in which the comparison result in a mismatch.

In another aspect, the invention provides a method of processing a sequence of visual images, for identifying areas of visual attention, comprising the steps of:

storing a sequence of images as a multi dimensional array of pixels, each pixel having a value;

selecting test pixels from the array, for each test pixel, selecting one or more neighbour groups of pixels neighbouring the test pixel;

selecting comparison pixels from the array;

identifying a group of pixels neighbouring a selected comparison pixel having the same respective positional relationships to the comparison pixel as a selected neighbour group of pixels has to the test pixel;

comparing the values of the selected neighbour group with the values of the identified group in accordance with a predetermined match criterion, generating a measure of visual attention for each test pixel, in dependence upon the number of comparisons made for that test pixel for which the comparison results in a mismatch.

In a yet further aspect, the invention provides a method of processing a moving image, for identifying areas of visual attention, comprising: storing successive pictures of the moving image as respective arrays of picture element values;

defining a test group of picture elements comprising a first test picture element and a second test picture element having a spatial offset and a temporal offset from the first; defining a comparison group of picture elements comprising a first comparison picture element having a spatial and temporal offset from the first test picture element and a second comparison picture element having a spatial and temporal offset from the first comparison picture element equal respectively to the spatial and temporal offset of the second test picture element from the first test picture element;

comparing the picture element values of the first and second test picture elements with the picture element values of the first and second comparison picture elements respectively, in accordance with a predetermined match criterion;

defining further such comparison groups and comparing the test pictures element with those of the further comparison groups;

generating a visual attention measure for the first test picture element in dependence on the number of comparisons made for it which the comparison results in a mismatch.

In another aspect, the invention provides a method of analysing a pattern represented by an ordered set of elements each having a value comprising, in respect of at least some of said elements:

selecting a group of test elements comprising at least two elements of the ordered set;

selecting a group of comparison elements comprising at least two elements of the ordered set, wherein the comparison group has the same number of elements as the test group and wherein the elements of the comparison group have relative to one another the same positions in the ordered set as have the elements of the test group;

comparing the value of each element of the test group with the value of the correspondingly positioned element of the comparison group in accordance with a predetermined match criterion to produce a decision that the test group matches or does not match the comparison group;

selecting further said comparison groups and comparing them with the test group;

generating a distinctiveness measure as a function of the number of comparisons for which the comparison indicates a mismatch.

The invention may be used to identify the principal subject in a visual scene, by identification of the region containing pixels having the greatest anomaly values. It may be used to determine a measure of visual attention afforded to a given object in a visual scene by comparison of the anomaly values generated for the pixels representing that object with the anomaly values generated for other parts of the scene.

The repetitive nature of the process lends itself to parallel processing, and it should be understood that several test pixels may be processed in parallel with each other, and for each test pixel, several groups of neighbour pixels may also be processed in parallel.

In order to allow for minor variations in intensity between otherwise similar elements of a scene, the comparison of values preferably allows a small difference in values between two pixels to be considered a match, and the term "substantially similar" used above should be understood in that context. The value of this threshold difference may be varied for different cycles, those values which produce a suitable distinction between elements being stored and re-used on subsequent cycles of the process.

For a colour image the intensity values may be three-element (red, green, blue) vectors. Alternatively other colour spaces such as hue, saturation, luminance etc. may be used.

This invention identifies saliency in visual scenes by measuring the difficulty in finding similarities between neighbourhoods in the scene. Pixels in an area that is similar to much of the rest of the scene therefore score low measures of visual attention, so are not considered to be worthy of attention. On the other hand a region that possesses many dissimilarities with other parts of the image will attract a high measure of visual attention, as the anomaly values scored will be large.

The invention makes use of a trial and error process to find dissimilarities between parts of the image and does not require prior knowledge of the nature of the anomalies to determine saliency. The method avoids the use of processing dependencies between pixels and is capable of a straight-forward parallel implementation for each pixel.

BRIEF DESCRIPTION OF THE DRAWINGS

A preferred embodiment will now be described, by way of example, with reference to the figures, in which

FIG. 2a represents an image to be processed by a method according to the invention, illustrating the comparison process for two sets of pixels $x_j$, $y_j$;

FIGS. 2b and 3b are mappings of the anomaly values generated for these images;

FIG. 4 illustrates schematically the basic components of a general purpose computer capable of performing the invention;

FIGS. 6a, 6b and 6c illustrate an image decoder according to the present invention;

FIG. 7 illustrates a 4:1:1 downsampling technique;

FIG. 8 illustrates separation of an image into block and block padding;

FIG. 9 illustrates zig-zag scanning;

FIG. 10 illustrates processing of an image bottom up and left to right;

FIG. 11 shows an example of a non-interleaved data stream;

FIG. 12 shows an example for selection of text pixel groups in order to increase processing speed.

DETAILED DESCRIPTION OF EXEMPLARY EMBODIMENTS

Figure 1A:
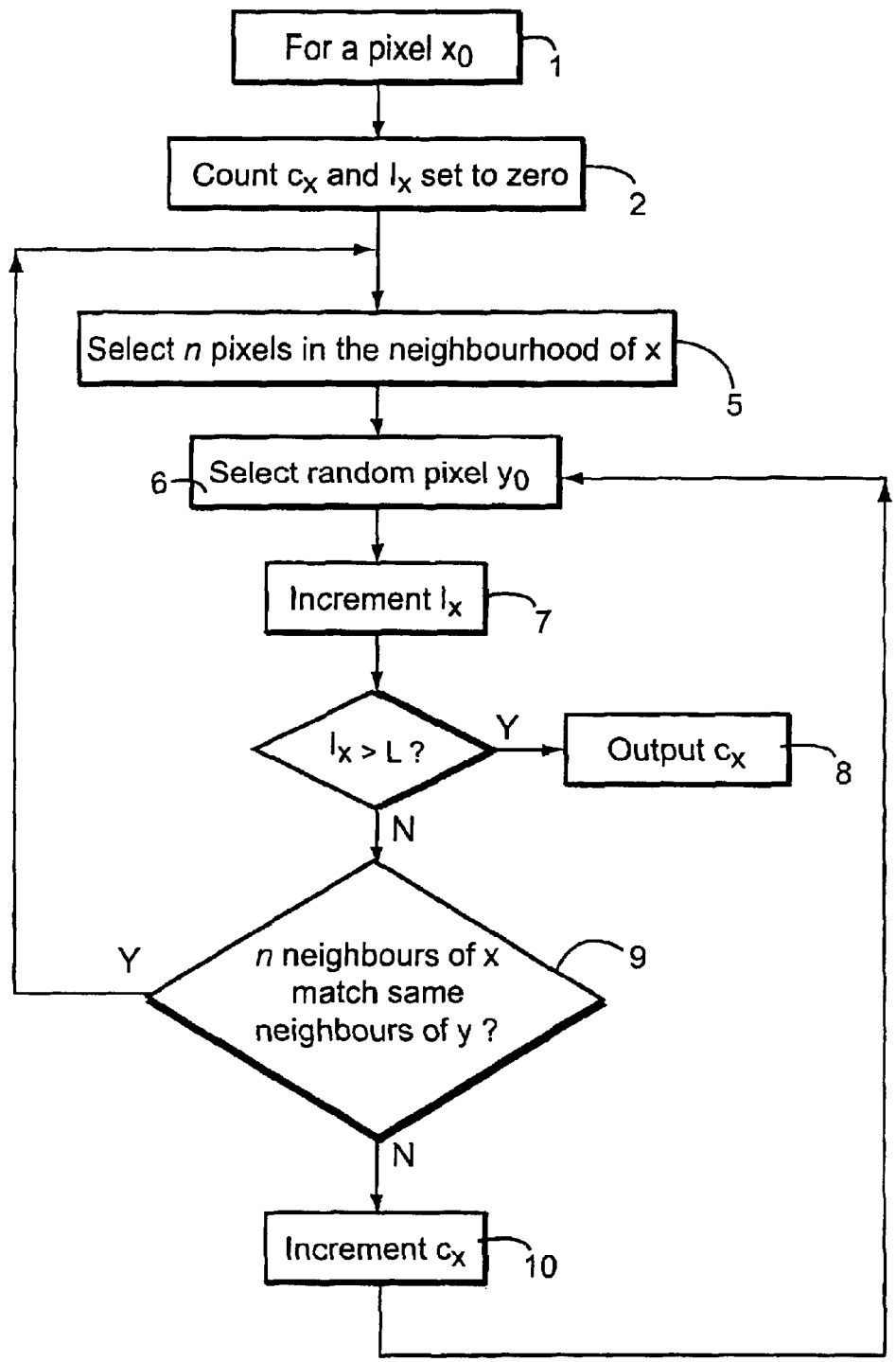
FIGS. 1A 1B and 1C are flowcharts which illustrate schematically the operation of three embodiments of the invention.

The components illustrated in FIG. 4 comprise an input means 41, such as a scanner, a central processing unit (CPU) 42, an output unit such as a visual display unit (VDU) or printer 43, a memory 44, and a calculation processor 45. The memory includes stores 440, 444–446, registers 441, 447–449 and counters 442, 443. The data and the programs for controlling the computer are stored in the memory 44. The CPU 42 controls the functioning of the computer using this information.

Considering now FIGS. 1A and 4, an image 40 to be analysed is accessed by the input means 41 and stored in a digital form in an image store 440, an array A of pixels x where each pixel has colour intensities $(r_x, g_x, b_x)$ attributed to it.

A pixel $x_0$ is then selected from the array A (step 1), and its intensity value $(r_x, g_x, b_x)$ is stored in a test pixel register 441.

An anomaly count $c_x$, stored in an anomaly counter 442, and a count of the number of pixel comparisons $I_x$ (stored in a comparison counter 443) are both set to zero (step 2).

The next step is the random selection of a number of points in the vicinity of the test pixel $x_0$. This region is defined by a distance measure $u_x$ (typically in units of pixels). Thus, n pixels $x_j$ are selected such that $$\text{dist}(x_j - x_{j-1}) < u_x$$

where $j=1, \ldots, n$ and $x_0 = x$.

The distance used may be any of those conventionally ued, such as the Euclidean distance or the "city block" distance between the positions within the image of the two pixels. If the horizontal and vertical coordinates of x are $p(x_j)$ and $q(x_j)$ the Euclidean distance is pixels. If the horizontal and vertical coordinates of $x_j$ are $p(x_j)$ and $q(x_j)$ then the Euclidean distance is $$\sqrt{[p(x_j) - p(x_{j-1})]^2 + [q(x_j) - q(x_{j-1})]^2}$$

whilst the city block distance is $$|p(x_j) - p(x_{j-1})| + |q(x_j) - q(x_{j-1})|$$

Typically n=3, and $u_x=1$. An example of such a group is shown in FIG. 2a, in which the test pixel, (shown boxed) has pixels (shown shaded) associated with it. For $u_x=1$, the pixels are contiguous, but, in general the pixels may not necessarily neighbour one another or be contiguous in any sense. The definition of the neighbour pixels is stored in the neighbour group definition store 444.

A pixel $y_0$ is now selected randomly (step 6) from the array A to be the current comparison pixel (also shown boxed in FIG. 2a) whose identity is stored in a comparison pixel register 447.

The value of $I_x$ stored in the comparison counter 443 is incremented (step 7): if a limit L is exceeded, no further comparisons for the test pixel x are made (step 8). The contents of the neighbour group definition register 444 are then used by the calculation processor 45 to define a set of pixels forming a test group $x_j$ (register 448) and a set of pixels forming a comparison group $y_j$ (register 449), each pixel $y_j$ of the comparison group having the same positional relationship to the comparison pixel y as the corresponding pixel $x_j$ in the test group has to the test pixel x (step 9).

The calculation processor 45 then compares each of the pixels $x_j$ (shaded in FIG. 2a) with the corresponding pixel $y_j$ (also shown shaded), using a set of threshold values $\Delta r_x$, $\Delta g_x$ and $\Delta b_x$.

A pixel y is identified as being similar to a test pixel x if:

$$|r_y - r_x| < \Delta r_x$$

and $$|g_y - g_x| < \Delta g_x$$

and $$|b_y - b_x| < \Delta b_x.$$

where $\Delta r_x$, $\Delta g_x$ and $\Delta b_x$ are threshold values which are, in this embodiment, fixed.

If all the pixels $x_j$ in the test group are similar to their corresponding pixels $y_j$ in the comparison group, the process is repeated by selecting a new set of neighbouring pixels (step 5) and a new comparison pixel $y_0$ (step 6). If (as illustrated in FIG. 2a) one or more pixels $x_j$ in the test group are not similar to the corresponding pixel $y_j$ in the comparison group, in accordance with the similarity definition above, the count $c_x$ stored in the anomaly count register 442 is incremented (step 10). Another comparison pixel $y_0$ is randomly selected and stored in the comparison pixel register 447 (return to step 6) and the neighbour group definition retrieved from the neighbour group definition store 444 is used to supply a new comparison neighbour group to the comparison group register 449 for comparison with the test group stored in the test group register 448. A set of pixels $x_j$ is retained in the test group register 448 so long as it continues to fail to match other parts of the image. Such a set represents a distinguishing feature of the locality of x—the more failures to match that occur, the more distinctive it is. The more comparison pixels y that the test pixel x fails to provide matches for, the higher the anomaly value $c_x$ stored in the anomaly counter 442 becomes. Conversely, the more matches that the test pixel x generates, the lower the value of the anomaly value when the threshold L is reached by the comparison counter 443. As L comparisons are made each time, the anomaly value $c_x$ which results from the process may be considered to be a measure of the proportion of randomly selected pixels which would fail to provide a match for the test pixel x.

When the iteration value $I_x$ stored in the comparison counter 443 reaches the threshold value L, the iterative process stops (step 8) and the current anomaly value $c_x$ stored in the anomaly counter 442 is output at the output unit 43 as the anomaly value for the pixel x. This final anomaly value $c_x$ is the measure of visual attention for the test pixel x, and is the number of attempts (from a total of L attempts) for which the inherent characteristics (i.e. the colours) of randomly selected neighbours of pixel x failed to match the corresponding neighbours of randomly selected pixels y. A high value for $c_x$ indicates a high degree of mismatch for pixel x with the rest of the image and consequently that pixel x is part of an object worthy of visual attention.

In this embodiment, the process is repeated, from step 1, for every pixel in the image as the test pixel, so that a value $c_x$ is obtained for every pixel x in the array A. Typically, L may be set to be 100.

As described above, comparisons are performed for the neighbouring pixels $x_j, y_j$, j=i, ... n; however, if desired, the original or root pixels may also be included, the comparisons being performed for j=0, ..., n.

The output unit 43 is typically a storage medium which tores the anomaly values of each pixel for display by means of a printer, visual display unit, etc. or for subsequent processing, for example image compression as will be described later with reference to FIGS. 5 to 11.

Figure 1B:
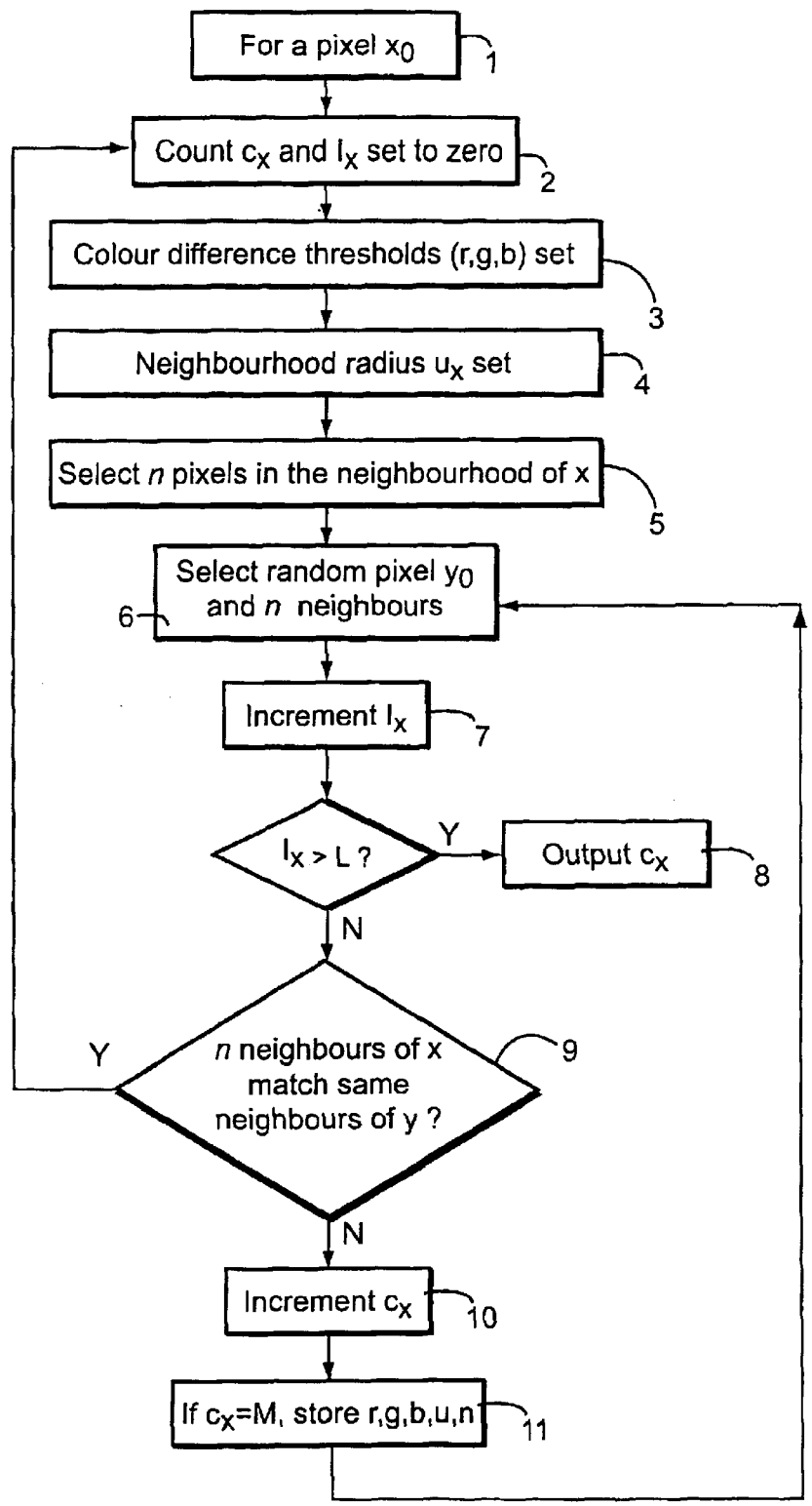

Considering now FIGS. 1B and 4, the image 40 to be analysed is accessed by the input means 41 and stored in a digital form in an image store 440, as an array A of pixels x where each pixel has colour intensities $(r_x, g_x, b_x)$ attributed to it, or, in the case of grey level images, a single grey scale intensity value $t_x$.

A pixel $x_0$ is then selected from the array A (step 1), and its intensity value $(r_x, g_x, b_x)$ or $t_x$ stored in a test pixel register 441. Several test pixels may be processed in parallel, but for purposes of illustration only one will be considered here.

An anomaly count $c_x$, stored in an anomaly counter 442, and a count of the number of pixel comparisons $I_x$ (stored in a comparison counter 443) are both set to zero (step 2).

A search strategy is then selected by the CPU 42 (steps 3, 4, 5) and provided to a neighbour group definition store 444. Each such strategy comprises a set of colour difference thresholds $(\Delta r_x, \Delta g_x, \Delta b_x)$, (or in the case of grey level images a single threshold $\Delta t_i$), (step 3) and a neighbour group definition (steps 4, 5).

In another embodiment of the invention operating on colour images in the hue, saturation, value (HSV) space $\Delta h_x$, $\Delta s_x$, $\Delta v_x$ colour difference thresholds can be used as will be described in more detail later. The thresholds used in an embodiment of the invention for colour images will depend upon the colour space in which the comparison between pixels is carried out.

In the first embodiment of the invention the colour difference thresholds were predetermined and were not changed with each selection of a new neighbour group definition strategy.

Initially the search strategies will be generated at random by the CPU 42,—if the strategy is not suitable for identifying differences the cycle will be rejected (step 9 below) and a new strategy selected. Successful strategies can be stored in a search strategy store 445 for subsequent re-use (step 11).

The colour difference thresholds selected in step 3 determine whether two pixels are to be considered similar. The difference thresholds must exceed a certain minimum otherwise no similarities will be detected, but if they are too great too many similarities will be found.

To define a neighbour group a radius $u_x$ is selected at random within certain bounds (step 4). This value determines the extent of the neighbourhood of x within which pixel similarity comparisons will be made by the calculation processor 45. The bounds on $u_x$ are determined by the scale of the features that establish visual attention, which will depend on the purpose for which the image is to be analysed. As with the difference thresholds, the selection is random within these limits, selections which fail to provide a distinction being rejected (step 9).

A group of n pixels $x_j$ in the neighbourhood of the test pixel x is selected from the image store 440 (step 5). Again, this selection is random, the selection being such that:

$$\text{dist}(x_j, x_{(j-1)}) < u_x$$

where j=1, ..., n and $x_0$=x

As the selection is random, such a group of pixels may not necessarily neighbour one another or be contiguous in any sense.

An example of such a group is shown in FIG. 2a, in which the test pixel (shown boxed) has a group (shown shaded) associated with it. Typically n=3, and $u_x$=1. If desired, $u_x$ may vary with j: this allows pixels to be selected from a wide region whilst ensuring that some of the selected pixels are close to the test pixel $x_0$. The value of dist $(x_j, x_{(j-1)})$ may be defined in any suitable units, such as pixel size. The definition of the neighbour group is stored in the neighbour group definition store 444.

Alternatively, a group of n pixels $x_j$ in the neighbourhood of the test pixel x can be selected from the image store 440 (step 5), the selection being such that:

$$\text{dist}(x_0, x_{(j)}) < u_x$$

where j=1, ..., n and $x_0$=x

Previously generated search strategies, comprising neighbour pixel groups definitions $x_j$ and associated colour difference thresholds $(\Delta r_x, \Delta g_x, \Delta b_x)$ stored in the search strategy store 445 as a result of achieving a high anomaly score on previous test pixels (step 11, to be discussed) may be preferentially selected by the CPU 42, randomly generated candidates only being supplied by the processor 42 to the current neighbour group definition store 444 when the supply of such stored criteria is exhausted. This mechanism reduces the number of unsuccessful iterations of the process and enhances the anomaly values in the vicinity of the object of attention by reusing features that highlight mismatches in the current image.

Similarly, when processing many similar images (for example in a moving image, or any other large set of similar images such as medical smear tests), test groups that have achieved high anomaly scores on previous tests may be retrieved from the search strategy store 445.

A pixel y is selected randomly (step 6) to be the current comparison pixel (also shown boxed in FIG. 2a) whose identity is stored in a comparison pixel register 447.

The value of $I_x$ stored in the comparison counter 443 is incremented (step 7). The contents of the neighbour group definition store 444 are then used by the calculation processor 45 to define a set of pixels forming a test group $x_j$ (register 448) and a set of pixels forming a comparison group $y_j$ (register 449), each pixel $y_j$ of the comparison group having the same positional relationship to the comparison pixel y as the corresponding pixel $x_j$ in the test group has to the test pixel x (step 9). The calculation processor 45 then compares each of the pixels $x_j$ (shaded in FIG. 2) with the corresponding pixel $y_j$ (also shown shaded), using the threshold values retrieved from the neighbour group definition store 444.

Pixels y are identified as being similar to the test pixel x if:

$$|r_y-r_x|<\Delta r_x, \text{ and } |g_y-g_x|<\Delta g_x, \text{ and } |b_y-b_x|<\Delta b_x.$$

For grey level images $|t_y-t_x|<\Delta t_x$.

In another embodiment in which the calculation is carried out in the HSV colour space pixel y is identified as being similar to test pixel x is:

$$|v_y-v_x|<\Delta v_x, \text{ and } |s_y-s_x|<\Delta s_x, \text{ and } |h_y-h_x|<\Delta h_x$$

where $\Delta h_x=Z^*(2-v_x)^*(2-s_x)$. Z is stored in en empirical table of thresholds dependent upon $h_x$. This results in a larger value of $\Delta h_x$ for low values of $v_x$ and $s_x$. In order to speed up the operation of the method of the invention for binary images comparison pixel y may be selected from only those pixels which match test pixel x (i.e. by ignoring background pixels whether they be 'white' or 'black').

If all the pixels $x_j$ in the test group are similar to their corresponding pixels $y_j$ in the comparison group, the process is repeated by selecting a new comparison strategy (steps 3, 4, 5) and a new comparison pixel y (step 6). If (as illustrated in FIG. 2a) one or more pixels $x_j$ in the test group are not similar to the corresponding pixel $y_j$ in the comparison group, in accordance with the similarity definition above, the count $c_x$ stored in the anomaly count register 442 is incremented (step 10). Another comparison pixel y is randomly selected and stored in the comparison pixel register 447 (return to step 6) and the neighbour group definition retrieved from the neighbour group definition store 444 is used to supply a new comparison neighbour group to the comparison group register 449 for comparison with the test group stored in the test group register 448. A set of pixels $x_j$ is retained in the test group register 448 so long as it continues to fail to match other parts of the image. Such a set represents a distinguishing feature of the locality of x—the more failures to match that occur, the more distinctive it is. The more comparison pixels y that the test pixel x fails to provide matches for, the higher the anomaly value $c_x$ stored in the anomaly counter 442 becomes. Conversely, the more matches that the test pixel x generates, the lower the value of the anomaly value when the threshold L is reached by the comparison counter 443. As L comparisons are made each time, the anomaly value $c_x$ which results from the process may be considered to be a measure of the proportion of randomly selected pixels which would fail to provide a match for the test pixel x.

As the process continues, successful search strategies (that is, combinations of values of $\Delta r_x$, $\Delta g_x$, $\Delta b_x$ and $u_x$, and neighbour groups, which generate high values of $c_x$) will become apparent. If a group of n pixels $x_j$ and the corresponding colour difference thresholds ($\Delta r_x$, $\Delta g_x$, $\Delta b_x$) cause the anomaly value of $c_x$ stored in the anomaly counter 442 to reach a threshold M before a match is found, the search strategy stored in the neighbour group definition store 444 is copied to the search strategy store 445 (step 11) for future use, if it is not already stored. The strategies that have generated high anomaly values are thus available in the search strategy store 445 for use in selecting suitable values in further cycles (steps 3, 4, 5). Once a match is found, the process starts again with a new search strategy (colour difference threshold and neighbour set) stored in the neighbour group definition store 444 (step 9), either by retrieval from the search strategy store 445 or generated randomly.

When the iteration value $I_x$ stored in the comparison counter 443 reaches a threshold value L, the iterative process stops (step 8) and the current anomaly value $c_x$ stored in the anomaly counter 442 is output at the output unit 43 as the anomaly value for the pixel x. This final anomaly value $c_x$ is the measure of visual attention for the test pixel x, and is the number of attempts (from a total of L attempts) for which the inherent characteristics (i.e. the colours) of randomly selected neighbours of pixel x failed to match the corresponding neighbours of randomly selected pixels y. A high value for $c_x$ indicates a high degree of mismatch for pixel x with the rest of the image and consequently that pixel x is part of an object worthy of visual attention.

The output unit 43 is typically a storage medium which stores the anomaly values of each pixel for display by means of a printer, visual display unit, etc. or for subsequent processing, for example image compression as will be described later with reference to FIGS. 5 to 11.

In the above examples, an anomaly value $c_x$ is formed for every pixel of the array. However, in order to increase the speed of operation, the values $c_x$ may be formed only for a subset of the pixels, for example on a regular grid such as represented by the shaded pixels in one of the layouts shown in FIG. 12. Once attention values have been generated for the pixels in the subset, then further pixels in the vicinity of those having a high measure $c_x$ may then be processed. For example one might choose the top 20% of the pixels (in terms of measures $c_x$) and process the pixels within a small defined area of each.

It will be understood that although the invention has been described with reference to a two dimensional image having three valued (R,G,B/H,S,V) or single valued points (grey level images) the method is extensible to n dimensional images having p valued points.

In the case of the use of p valued points then the function for evaluating whether two pixels are similar at step 9, described above for grey level, R,G, B and H,S,V images is extended to compare the p values.

In the case of n-dimensional images the selection of neighbour pixels is made using an n dimensional distance measure in order to select the neighbour group at step 5. In this way it is possible to apply the method of the invention to a sequence of successive frames in a video sequence where one of the dimensions used relates to time.

Two simplified examples of the invention in use will now be described. FIG. 2a illustrates a monochrome image having several vertical features and a single diagonal feature. It will be seen from FIG. 2a that a group of pixels forming a set of neighbours to a pixel from one of the vertical features will match with those neighbouring pixels from other vertical features. However, a pixel forming part of the diagonal feature is unlikely to obtain a match with pixels from the other features. Even pixels elsewhere in the diagonal feature will fail to produce a match if the neighbour pixels of either the test pixel or the comparison pixel extend beyond the end of the feature. Therefore, the probability of obtaining a match for any neighbour set is very much less for a pixel forming part of the diagonal feature, than if it is for one forming part of one of the vertical features.

In the illustrated embodiment the pixels form a regular rectilinear tessellation, but the process is suitable for other arrangements of pixels. If the array is irregular, the positional relationship of each pixel $y_j$ to the comparison pixel y may not be exactly the same the positional relationship of each pixel $x_j$ to the test pixel x, but each one will be the closest possible to the exactly corresponding position.

The process possesses several advantages over other procedures. Firstly the process makes no assumptions about the content of the image and is able to extract useful features relevant to the content as part of the measurement process and hence is able to adapt to the material in any image. Secondly the process applies equally to any configuration of pixels whether arranged in a rectangular array, a spiral array, or an irregular pattern. Thirdly the process may be applied to each pixel $x_i$ without any dependency on the computations associated with other pixels and hence may be applied in parallel to many pixels simultaneously. This means that with a parallel implementation results may be obtained from video material in real time, or even faster. Fourthly the algorithm is based upon an evolutionary procedure which has the advantage that trials do not have to be prepared with the rigour normally afforded software processes. Some cycles may not produce useful results, for example because they contain obvious redundancy (e.g. a group of neighbour pixels $x_j$ which includes the same pixel more than once). Such cycles are rejected in the same way as any other cycle that fails to identify distinguishing features, without any special rejection process being necessary to identify such groups. This effectively removes the computational burden required to accurately construct viable candidates for trial.

In the following simplified examples, the process has been applied to black and white images consisting entirely of ones and zeros. In this case $\Delta t_x = \frac{1}{2}$, n=3, L=100, and $u_i$=1. The first example (FIG. 2a, FIG. 2b) exemplifies the classical problem of "popout" in which certain types of shape stand out if they are surrounded by different shapes.

The measures of visual attention attributed to each pixel in FIG. 2a are shown in the chart in FIG. 2b. The vertical scale indicates the anomaly value (expressed as a percentage of the number of attempts L) for each pixel. It can be seen that the anomaly values $c_i$ are very much higher for the diagonal bar than for the vertical bars.

Figure 3A:
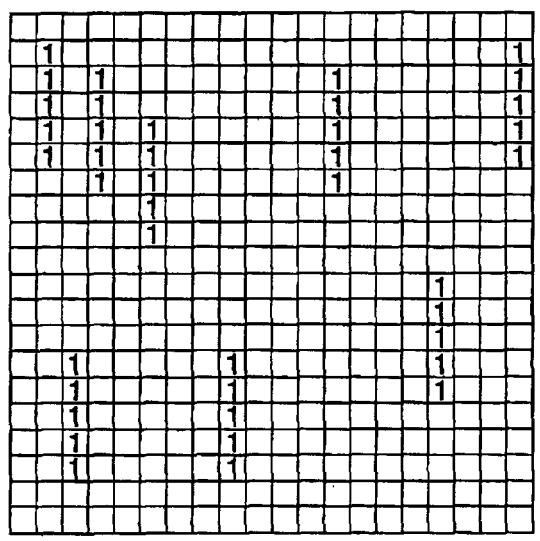
FIG. 3a represents a second image to be processed by a method according to the invention.
Figure 3B:
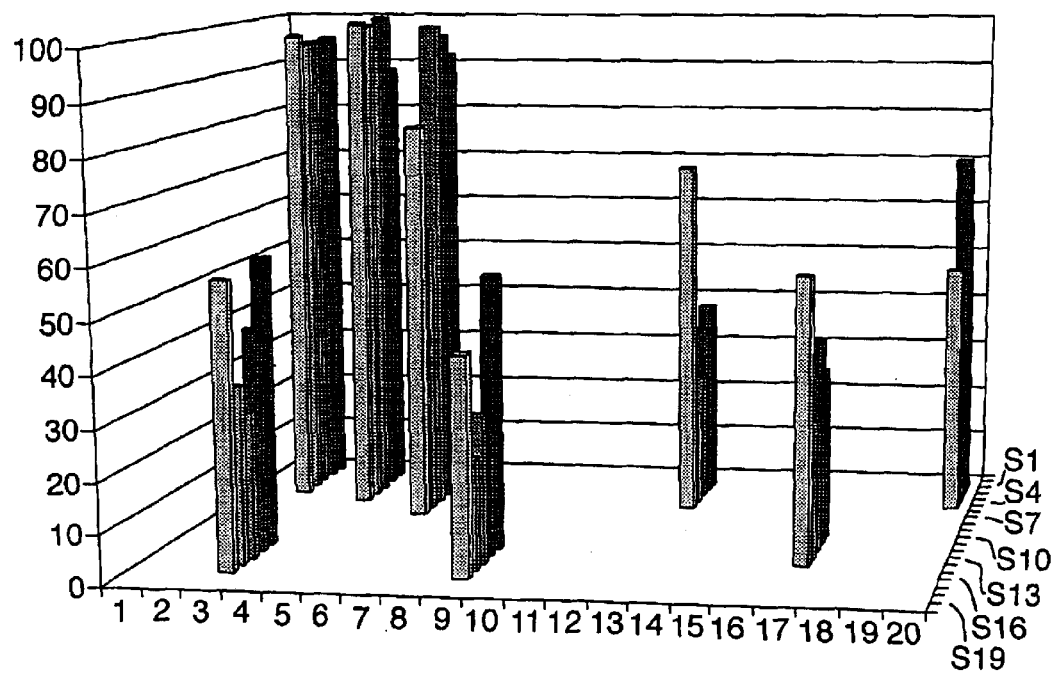

FIG. 3a illustrates the effect of clustering on visual attention where a grouping of vertical lines is placed amongst others that are more widely separated. The results of using the process of this invention are shown in FIG. 3b. Again, the clustered lines produce a higher anomaly score.

It will be noted that the process does not require any previous knowledge of the nature of the anomalies being searched for. The anomaly may be in orientation (as in FIG. 2a), spacing (as in FIG. 3a), shape, length, colour or any other characteristic.

The invention is of wide application in a number of fields. Firstly, identification of the principal subject in a visual scene is the first essential stage in the categorisation of unfiltered visual content—it is also the most difficult. Once this step has been achieved, it may be followed by manual tagging, or a range of template matching or other automatic techniques for recognition of the features so identified.

The possibility of operation in more than two dimensions has already been mentioned. An example of the analysis of a moving picture where pixel values are a function of horizontal and vertical position, and time, will be now be described. For this purpose the input device would, instead of a scanner, comprise a video input and a frame capture device (of conventional construction) for storing several consecutive frames of an image in the store 440. In the examples given below, the store 440 would need to contain three, or four, consecutive frames.

Suppose that each pixel value a is a function of p, q and t, i.e. the horizontal and vertical position within the picture, and time expressed as a number of frames. As before, we wish to compare a test group of pixels $x=(x_0, x_1, x_2, \ldots x_n)$ where $x_j$ has spatial coordinates $p_j$, $q_j$ and time $t_j$ with randomly selected comparison groups such as $y=(y_0, y_1, y_2 \ldots y_n)$ (where $y_k$ is $p_k$, $q_k$, $t_k$). $x_1$, $x_2$ etc. are chosen to lie within some distance in p, q, t space of a starting pixel $x_0$. $y_1$, $y_2$ etc. have in this space the same positions relative to $y_0$; that is:

$$p(x_j) - p(x_0) = p(y_j) - p(y_0)$$

$$q(x_j) - q(x_0) = q(y_j) - q(y_0)$$

$$t(x_j) - t(x_0) = t(y_j) - t(y_0)$$

As before, the spatial displacements of $x_j$ from $x_0$ (or $x_{j-1}$) are selected at random subject to a limit $u_x$. The temporal displacements could also be selected at random within a time limit τ, or if desired could be zero, so that $x_j$ are all from the same frame, but we prefer to avoid selecting a test group (or comparison group) entirely from one frame, and therefore in this example we apply an additional constraint that at least one pixel is selected from a different frame from the one in which the "root" pixel $x_0$ (or $y_0$) lies. Thus, in this example, we choose n=1 and require that $t(x_1)-t(x_0) \equiv t(y_1)-t(y_0) \equiv 1$ that is, every group of pixels consists of a pixel from one frame t and a pixel from the following frame. Further, we prefer that the comparison pixel $y_0$ is always chosen from a different frame forom the one in which $x_0$ lies: in this example we require that $t(y_0)=t(x_0)+1$ so that the comparison group is one frame later in time than the test group.

Figure 1C:
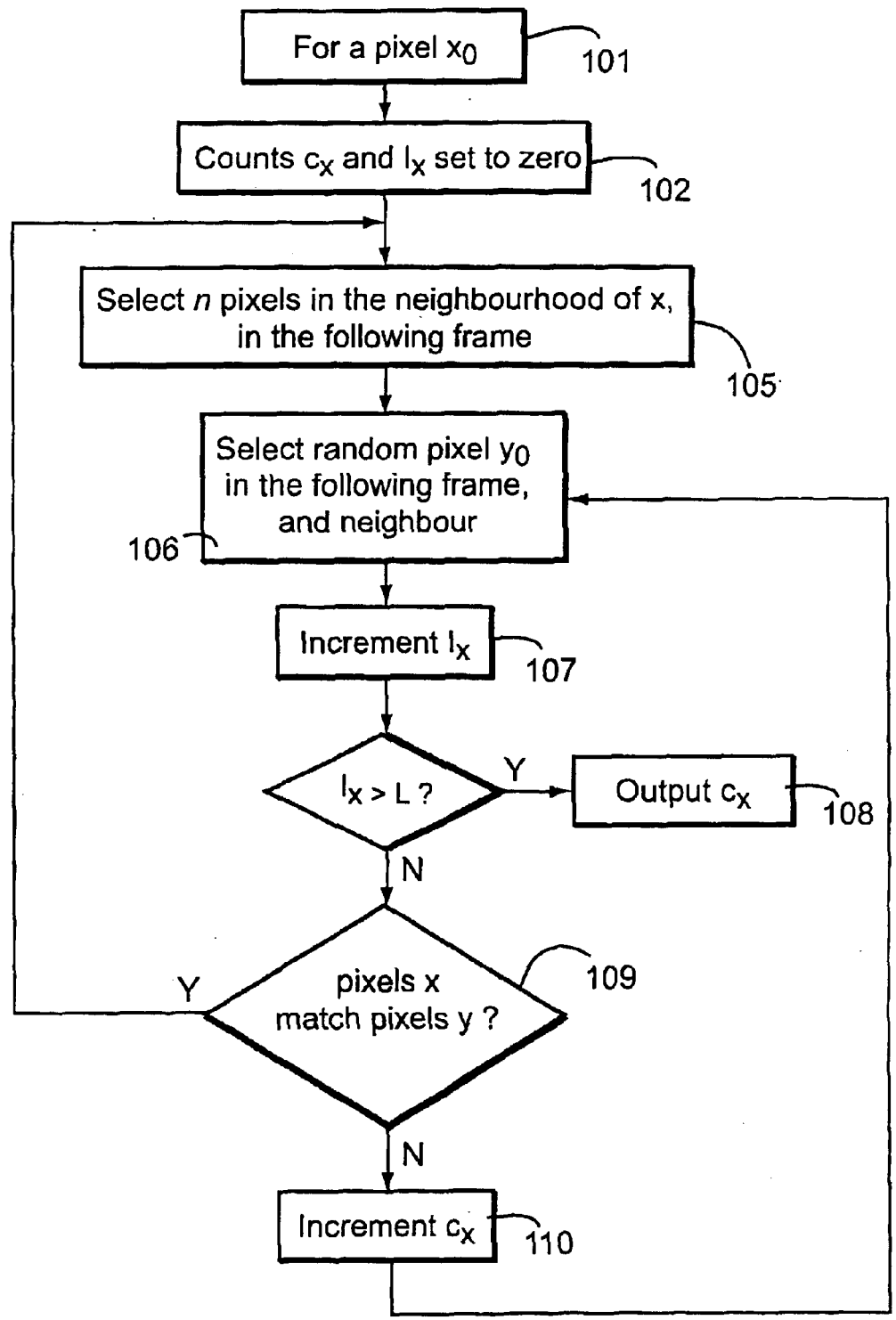

The procedure used is shown in FIG. 1C:

Step 101. Test pixel $x_0$: (p, q, t)=(1, 1, T−1).

Step 102. Set $c_x$ and $I_x$ to zero.

Step 105. Choose at random a pixel $x_1=(p+\Delta p, q+\Delta q, T)$, with $\Delta p \leq u_x$, $\Delta q \leq u_x$.

Step 106. Choose pixel $y_0=(p', q', T)$ where p', q' are selected at random from the array; Define pixel $y_1=(p'+\Delta p, q'+\Delta q, T+1)$ Step 107. Increment $I_x$. If the number of comparisons $I_x > L$, $c_x$ contains the score for x: choose a new pixel $x_1$ and go to step 108.

Step 109. Test for a match between x and y—i.e.

if $|r(x_0)-r(y_0)| \leq \Delta r$ and $|g(x_0)-g(y_0)| \leq \Delta g$ and $|b(x_0)-g(y_0)| \leq \Delta g$ and $|r(x_1)-r(y_1)| \leq \Delta v$ and $|g(x_1)-g(y_1)| \leq \Delta g$ and $|b(x_1)-b(y_1)| \leq \Delta b$ a match has been found.

If a match is found, go to step 105.

Step 110. If no match is found, increment $c_x$ and go to step 106.

Figure 13:
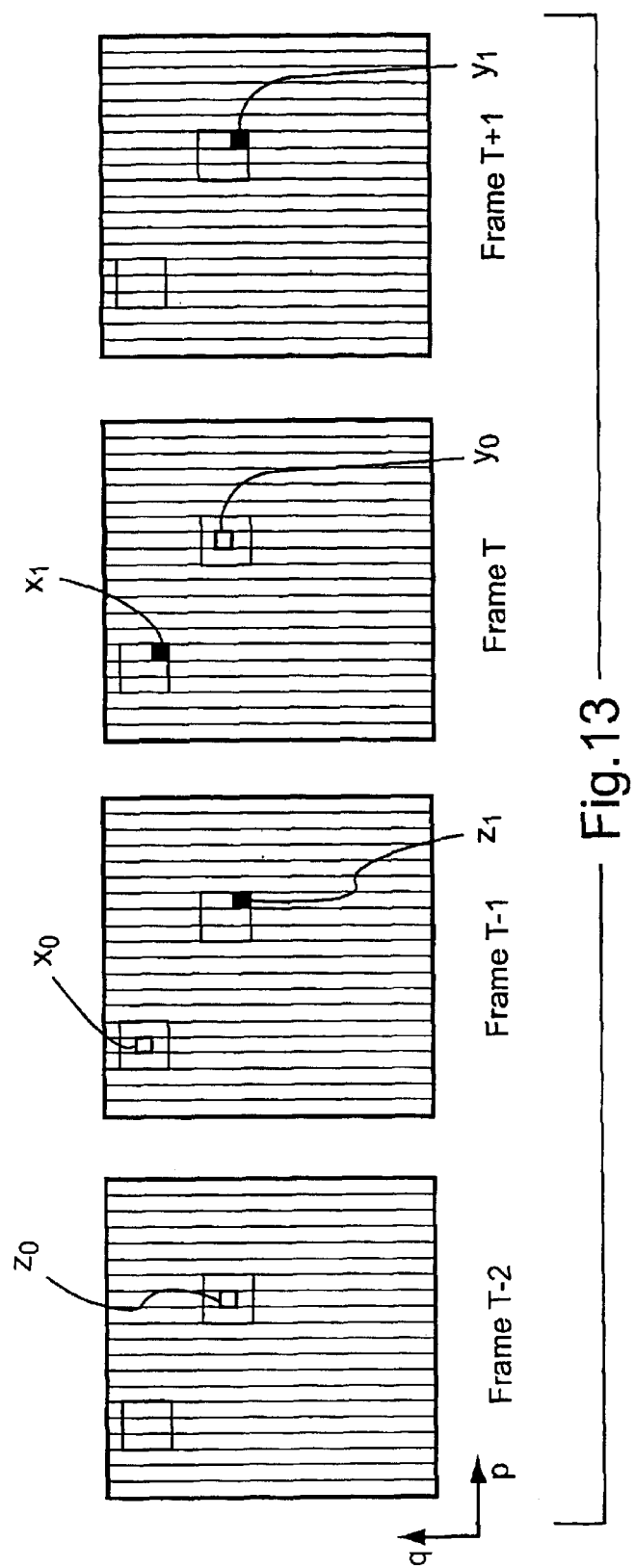
FIG. 13 illustrates the processing of consecutive frames of a moving picture.

Whilst the above gives satisfactory results, it can be improved by choosing a third pixel group consisting of pixel $z_0$ in frame T−2 having the same absolute position as $y_0$ and choosing pixel $z_1$ in frame T−1 having the same absolute spatial position as $y_1$. The procedure is substantially the same, the criterion for a match being that x matches both y and z. For the purposes of illustration, FIG. 13 shows four frames T−2, T−1, T and T+1, with a pixel $x_0$ in frame T−1 and its neighbour $x_1$ in frame T with a spatial offset (1,−1), whilst pixels $y_0$ in frame T and $z_0$ in frame T−2 have the same spatial position as each other. Their neighbours $y_1$, $z_1$ (in frames T+1 and T−1) have the same spatial offset (1,−1) from $y_0$ or $z_0$, respectively, as $x_1$ has from $x_0$. The 3×3 boxes in the Figure simply serve to mark the same positions in consecutive frames.

These methods may also be applied to a pattern—that is, a set of ordered values—other than visual images. The ordered set may be a linear sequence of values, a two-dimensional array (as in the case of the visual image), or a multi-dimensional array. In each case, the values may be single values or may (as in the r, g, b case) be multi-element values. Examples of collections of data to which the method may be applied are seismological or other geological data, and data related to the operation of telecommunications systems, such as a log of accesses or attempted accesses to a firewall.

For the one-dimensional case, the values could be a sequence of binary values, such as a sequence of digital samples of an audio signal. The procedure for this case is as described above in connection with FIG. 1, except of course that the neighbouring elements of $x_0$ are selected to be within some one-dimensional, rather than two-dimensional, distance of $x_0$.

Figure 5A:
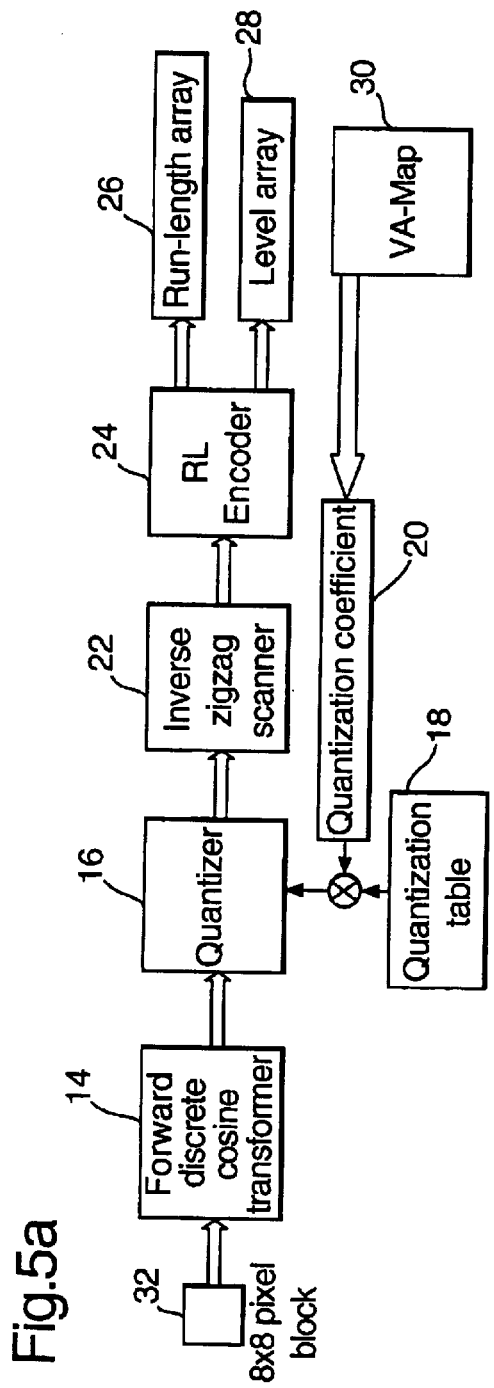
FIGS. 5a and 5b illustrate an image coder according to the present invention.
Figure 5B:
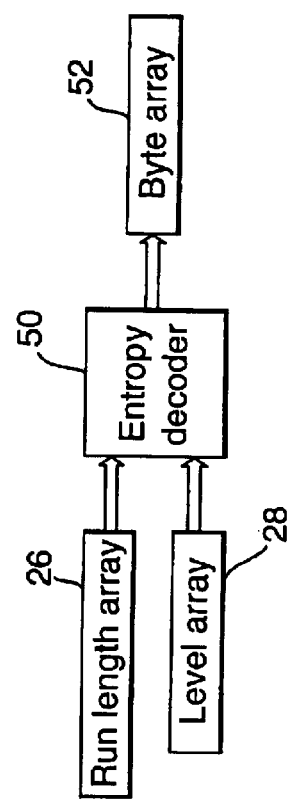

A method of image compression using the method of the invention will now be described with reference to FIGS. 5 to 11; firstly an overview of the method of compression of image data according to the invention will be provided with reference to FIGS. 5a and 5b.

Compression of images using a discrete cosine transform (DCT) is known. Many image compression algorithms, such as JPEG, use such compression and have been proven to work well. The principle of using the DCT is that the pixels in an image can be regarded as a 2-dimensional signal, which are transformed into the frequency domain by means of the DCT. Areas in images where there is little rapid change in colour and brightness are areas with low spatial frequencies whereas areas with greater changes in colour and brightness are areas with high spatial frequencies. Research has shown that the human eye is not very sensitive to high spatial frequencies, and that fact is used for the compression. It is much more important to have information about low spatial frequencies, so high spatial frequencies need not be transmitted or stored in order to restore the original image with reasonable quality. For high compression rates, a model of the human sensitivity to spatial frequencies is used, which can be regarded as a filter for certain frequencies.

Standard compression algorithms do not allow regions of interest to be automatically specified in images so that they can be compressed with higher quality than the background, so the compression is non-optimal. If an image is required to have a size of n bytes, the whole image is compressed with the same quality to meet the required file size, which in some cases may mean that the quality is very poor and unsatisfactory. There are always parts in images that are more interesting and parts that are of minor interest only. Consider the image to be a portrait. Usually only the person is of interest and not the background. So it would be advantageous to compress the background with a very high compression rate (low quality) and the rest of the image with very low compression rates (high quality). If the average compression rate is the same as for an image that is compressed with a constant compression rate, the resulting file size will be the same. However, the image compressed with a variable compression rate will give the viewer the impression that this image looks better than the one compressed with a constant compression rate for the whole image.

The method of this invention allows the user to compress an image using different levels of quality for different parts of the image. A level of quality is determined for a certain area in the image using a Visual Attention Map (VA-map) 30, which is created as earlier. After compression, the Visual Attention Map 30 will form part of the compressed image data.

The input image is an RGB image, i.e. its pixels are represented by a sum of the three base colours red, green and blue. Each of the three base colours is represented by an integer number between 0 and 255 although monochrome images can equally well be used.

The input image is transformed into YCbCr-colour space and at the same time decomposed into components luminance (Y) and chrominance (Cb and Cr). As the human eye is more sensitive to changes in brightness than in colour, the two colour components Cb and Cr are down sampled using a 4:1:1 down sampling scheme.

Then the components are segmented into 8×8 pixel blocks 32, each of which is treated individually by the compression algorithm. For all components (Y,Cb,Cr), the number of samples in each direction must be a multiple of 8 to provide complete pixel blocks for the subsequent processes. If the input image does not meet this requirement, additional samples are artificially created to fill in the empty pixel space in blocks. Because of down sampling, the number of blocks in x- and y-direction must be a multiple of 2 for the Y component, as will be explained later.

Note that the method described earlier produces a visual attention measure $c_x$ for every pixel in the image. For the purposes of this example of the compression method the Visual Attention Map comprise a single value (in the range 1 to 100) for each 8×8 block, which is obtained by taking the average of the 64 values $c_x$ for the pixels in the block. We also envisage that the value for the block be quantised to two bits (i.e. four levels). This could be done by partitioning the number range 1–100 into four equal (or if preferred, unequal) ranges, or more preferably, partitioning the actual range (between the maximum and minimum values actually occurring in the image into four ranges. Alternatively, the two-bit attention values 00, 01, 10, 11 could be assigned to the blocks in such a way that each value is always assigned to the same number of blocks. For example, if the image contains K blocks, then the K/4 blocks having the highest averaged attention values might be assigned the value 11, the next K/4, the value 10, and so on. A block is transformed into the frequency domain by means of a FDCT (Forward DCT) 14. The resulting coefficients are then quantized by a quantizer 16. The quantization leads to a reduction of data and is the key to the image compression. After quantization the image can no longer be reconstructed without error. However, by using a quantization table 18 which embodies the human sensitivity to spatial frequencies, the error can be so small that it is not perceptible. The level of quantization is influenced by a quantization coefficient 20, which is used to create varying levels of quality according to the Visual Attention Map 30 for the image.

After quantization, each block is converted into a 64-dimensional vector by means of a zigzag-scanner 22. This puts coefficients for low spatial frequencies to the beginning of the vector (low indices) and coefficients for high spatial frequencies to the end (high indices). As coefficients for high frequencies usually become zero as a result of the quantization, long sequences of zero are created by the zigzag-scanning process. The zigzag-vector is then encoded with a run-length encoder 24 and the result is stored in two arrays, a run length array 26 and a level array 28. Finally, when all blocks have been processed, these two arrays are entropy encoded by an entropy encoder 50 and the resulting byte array 52 is written to an output file together with the Visual Attention Map 30 and general information about the image. The file format will be described later.

Figure 6A:
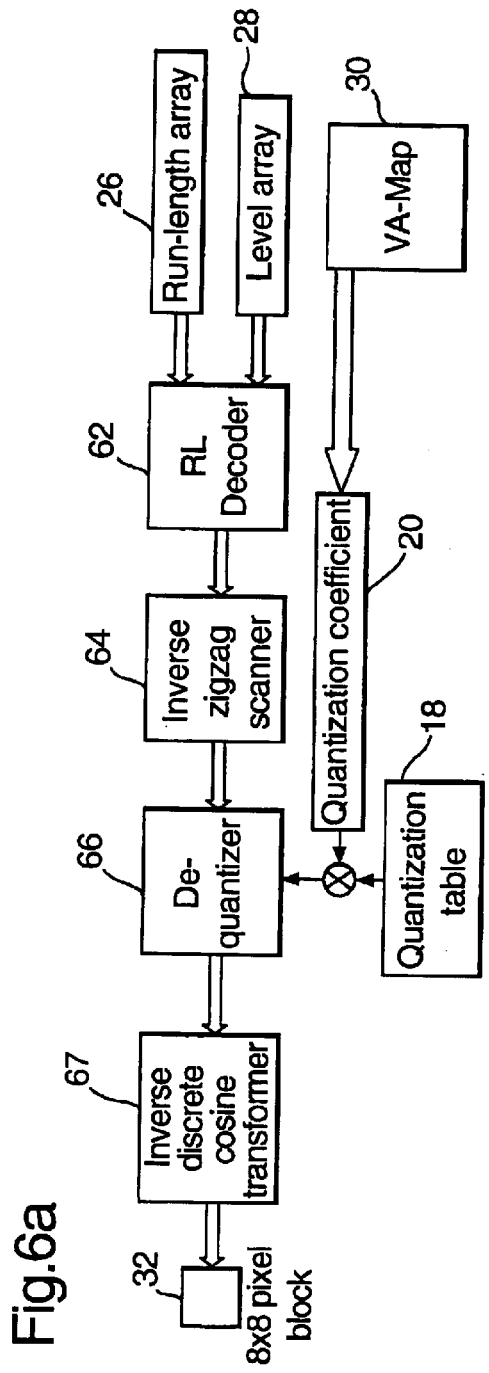
Figure 6B:
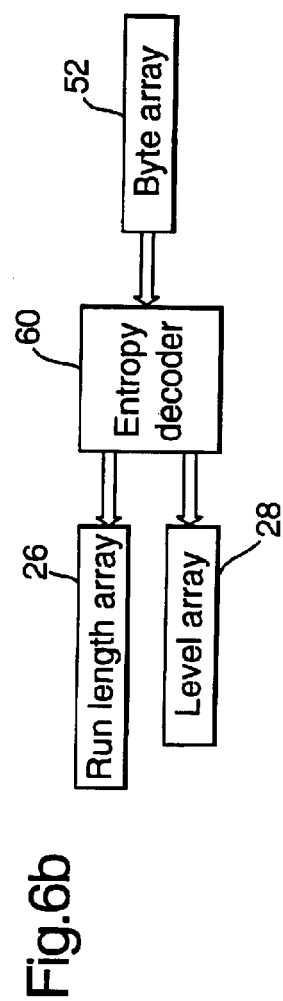

Decoding (decompression) of the image will now be described with reference to FIGS. 6a and 6b and then the function of the individual parts of the coder and encoder will be described with reference to FIGS. 7 to 11.

The decoding of the image data and reconstruction of the image is the reverse of the coding process described above. The image data in the byte array 52 is first entropy decoded by an entropy decoder 60 and the results segmented into array for single 8×8 blocks. The arrays for a single block 26, 28 are then run-length decoded by a run-length decoder 62, reordered as an 8×8-sample matrix using the inverse zigzag-scanner 64 and dequantized by a dequantizer 66 using an appropriate quantization table 18 together with information obtained from the VA-Map 30. Then the data transformed back from the frequency domain into component sample values by means of an inverse discrete cosine transformer 67 and the result is stored in different arrays for each component. Finally, the three component arrays are used to compose the final image. The Cb and Cr components are up sampled using linear interpolation filters 68, 69. The resulting image is likely to be larger than the original image because of block padding, and the image has to be cropped to its original size.

The formation of 8×8 pixel blocks 32 (FIGS. 5 and 6) from the original R, G, B image will now be described in more detail with reference to FIGS. 7 and 8

The transform from RGB values to Y, Cb, Cr values is given by the following equations:

$$Y = rnd(0.299 \cdot R + 0.587 \cdot G + 0.114 \cdot B)$$

$$Cb = \lfloor -0.1687 \cdot R - 0.3313 \cdot G + 0.5 \cdot B + 128 \rfloor$$

$$Cr = \lfloor 0.5 \cdot R - 0.4187 \cdot G - 0.0813 \cdot B + 128 \rfloor$$

R, G, B are in the range of [0, 255]. Y, Cb, Cr are also in the range [0, 255]. R, G, B and Y, Cb, Cr are integers.

The Cb and Cr components are down sampled using a 4:1:1 down sampling scheme. For every second pixel in x- and y-direction, all three components are stored. For the rest of the pixels, only the Y component is stored. This means that for every four Y samples there is one Cb sample and one Cr sample. This down sampling is illustrated schematically in FIG. 7 Thus, the Cb and Cr arrays are just a quarter of the size of the Y array. This can be done because the human eye is much more sensitive to changes in brightness (Y) than in colour (Cb, Cr).

Down sampling as described reduces the amount of data by a factor of 2.

Because of down sampling and the fact that all components are broken into 8×8 pixel blocks, the number of samples required for the subsequent processing needs to be a multiple of 8 in x- and y-direction for all components.

As can be seen in FIG. 7, to form a block of 8×8 samples, an array of 8×8 input samples (RGB-samples) is needed for the Y component whereas an array of 16×16 input samples (RGB-samples) is needed for the Cb and Cr component. A 16×16 input sample array is referred to as a macro-block. The level of interest for a colour component is defined as the maximum level of interest defined in the VA map of the 4 sample blocks forming the macro-block.

The number of 8×8 pixel blocks in x- and y-direction is given by the following equations:

$$bx_{Cb,Cr} = \left\lceil \frac{width}{16} \right\rceil$$

$$by_{Cb,Cr} = \left\lceil \frac{height}{16} \right\rceil$$

$$bx_Y = \left\lceil \frac{width}{16} \right\rceil \cdot 2$$

$$by_Y = \left\lceil \frac{height}{16} \right\rceil \cdot 2$$

In these equations, width is the number of input samples (pixels) in x-direction of the input image, and height is the number of input samples (pixels) in y-direction respectively. The total number of samples required in the image after samples are added at the boundaries can then be calculated as:

$$sx_{Cb,Cr} = bx_{Cb,Cr} \cdot 8$$

$$sy_{Cb,Cr} = by_{Cb,Cr} \cdot 8$$

$$sx_Y = bx_Y \cdot 8$$

$$sy_Y = by_Y \cdot 8$$

The number of samples to be added at the boundaries can be calculated:

$$px_{Cb,Cr} = sx_{Cb,Cr} - \left\lceil \frac{width}{2} \right\rceil$$

$$py_{Cb,Cr} = sy_{Cb,Cr} - \left\lceil \frac{height}{2} \right\rceil$$

$$px_Y = sx_Y - width$$

$$py_Y = sy_Y - height$$

Additional samples should be added such that no high spatial frequencies are generated. This is done by extending it with the boundary samples. This is easy to implement and automatically produces either no horizontal or no vertical frequencies. However, high frequencies in one direction may still be produced, depending on the content of the image at its boundary. First, all rows are padded with the value of the last sample at the boundary and then the columns are padded afterwards. The formation of 8×8 pixel blocks from the image is shown schematically in FIG. 8

For decompression of the image the inverse of the colour transform above is defined as follows:

$$R = rnd(Y + 1.402 \cdot (Cr - 128))$$

$$G = rnd(Y - 0.34414 \cdot (Cb - 128) - 0.71414 \cdot (Cr - 128))$$

$$B = rnd(Y + 1.772 \cdot (Cb - 128))$$

For the inverse colour transform, the resulting values for R, G, B may exceed the valid range of [0, 255] because of rounding. Thus, exceeding values are clamped to the minimum value and maximum value, respectively.

The Discrete Cosine Transform is used to transform the samples into the frequency domain The Forward Discrete Cosine Transform (FDCT) used by the transformer 14 is defined by:

$$S_{u,v} = \frac{1}{4} C(u) C(v) \sum_{x=0}^{7} \sum_{y=0}^{7} s_{x,y} \cos\frac{(2x+1)u\pi}{16} \cos\frac{(2y+1)v\pi}{16}$$

$$u, v = [0, 7]$$

$$C(i) = \begin{cases} \frac{1}{\sqrt{2}}; & i = 0 \\ 1; & \text{else} \end{cases}$$

$$i = [0, 7]$$

The component samples $s_{x,y}$ are DC-Level-Shifted prior to the computation of the FDCT to centre them around zero by subtracting 128 from each sample.

For decompression of the image the Inverse Discrete Cosine Transform used by the inverse discrete cosine transformer 67 is defined by:

$$s_{x,y} = \frac{1}{4} \sum_{u=0}^{7} \sum_{v=0}^{7} C(u) C(v) S_{u,v} \cos\frac{(2x+1)u\pi}{16} \cos\frac{(2y+1)v\pi}{16}$$

$$x, y = [0, 7]$$

$$C(i) = \begin{cases} \frac{1}{\sqrt{2}}; & i = 0 \\ 1; & \text{else} \end{cases}$$

$$i = [0, 7]$$

To reverse the DC-Level-Shifting, 128 is added to each sample $s_{x,y}$ after the computation of the IDCT.

The quantizer 16 operates as follows. Each of the 64 DCT coefficients from the transformer 16 is quantized by the quantizer 16 using values stored in the quantization table 18. The quantizer step size $S_{u,v}$ for each coefficient is calculated from the value of the corresponding element $Q_{u,v}$ from the quantization table multiplied by a quantization coefficient, which represents the level of quality as defined by the Visual Attention Map 30. The quantization table reflects the sensitivity of spatial frequencies of the human eye and is derived empirically. Two different Quantization Tables are used one for luminance components (Y) and one for chrominance components (Cb and Cr). Generally, the step size for the quantization of chrominance coefficients is greater than that for the luminance coefficients because the human eye is more sensitive to errors in luminance than to errors in chrominance.

Quantization is defined as follows:

$$S_{u,v}^q = rnd\left(\frac{S_{u,v}}{Q_{u,v} \cdot c_{q,l}}\right)$$

$$c_{q,l} = 0.5 + \frac{q_l}{32}$$

$$q_l = [0, 255]$$

$$c_{q,l} = [0.5, 8.46875]$$

Where the factor $q_1$ in is the quality level factor as defined by the visual attention map 10. in this embodiment of the invention the visual attention map supports four levels of quality, which are stored using two bits, these levels are mapped to appropriate numbers defining the quality level factors. The quality level factors for the individual levels of quality are stored in the compressed image file.

For decompression of images the inverse quantization function is given by the following equation:

$$S_{u,v}^d = S_{u,v}^q \cdot c_{q,l} \cdot Q_{u,v}$$

In this embodiment of the invention the quantization table for luminance coefficients is defined as:

| v ↓ | u→ 0 | 1 | 2 | 3 | 4 | 5 | 6 | 7 |
|---|---|---|---|---|---|---|---|---|
| 0 | 16 | 12 | 14 | 14 | 18 | 24 | 49 | 72 |
| 1 | 11 | 12 | 13 | 17 | 22 | 35 | 64 | 92 |
| 2 | 10 | 14 | 16 | 22 | 37 | 55 | 78 | 95 |
| 3 | 16 | 19 | 24 | 29 | 56 | 64 | 87 | 98 |
| 4 | 24 | 26 | 40 | 51 | 68 | 81 | 103 | 112 |
| 5 | 40 | 58 | 57 | 87 | 109 | 104 | 121 | 100 |
| 6 | 51 | 60 | 69 | 80 | 103 | 113 | 120 | 103 |
| 7 | 61 | 55 | 56 | 62 | 77 | 92 | 101 | 99 | and the quantization table for chrominance coefficients is defined as:

| v ↓ | u→ 0 | 1 | 2 | 3 | 4 | 5 | 6 | 7 |
|---|---|---|---|---|---|---|---|---|
| 0 | 17 | 18 | 24 | 47 | 99 | 99 | 99 | 99 |
| 1 | 18 | 21 | 26 | 66 | 99 | 99 | 99 | 99 |
| 2 | 24 | 26 | 56 | 99 | 99 | 99 | 99 | 99 |
| 3 | 47 | 66 | 99 | 99 | 99 | 99 | 99 | 99 |
| 4 | 99 | 99 | 99 | 99 | 99 | 99 | 99 | 99 |
| 5 | 99 | 99 | 99 | 99 | 99 | 99 | 99 | 99 |
| 6 | 99 | 99 | 99 | 99 | 99 | 99 | 99 | 99 |
| 7 | 99 | 99 | 99 | 99 | 99 | 99 | 99 | 99 |

After quantization, the 64 coefficients will include many zeros, especially for high frequency coefficients. In order to create long sequences of zeros, the 64 coefficients are converted from an 8×8 matrix to a 64-dimensional vector z and reordered in zigzag-sequence by the zig-zag scanner 22 as shown schematically in FIG. 9.

As the vector resulting from the zigzag scanning includes long sequences of zeros, run-length coding is used to reduce the amount of data.

Each value in the vector is represented by two output values, called a run-level combination, one defining the number of preceding zeros and one defining the level (value) of the non-zero value following the sequence of zeros. If all values following the last run-length-encoded value are zero in the vector, a special run-length combination of (0, 0) is used. This special combination is called the end of block (EOB) combination.

Because of the nature of the discrete cosine transform, the first element of the vector is the DC coefficient of the transformed image data. The DC coefficient is treated differently from the AC coefficients. The value that will be encoded is the difference of the current DC term from the previous DC term. This will produce smaller numbers to encode, which will help reducing the amount of data in subsequent entropy coding. The two values for run and level are output by the run length encoder 24 as two arrays, the run-length array 26 and the level array 28, which once all of the 8×8 pixel block have been processed are used by the entropy encoder 50 to further reduce the amount of data.

The levels are calculated as follows:

$$l_{DC}(k)=z_0(k)-l_{DC}(k-1)$$

$$l_{AC,i}(k)=z_i(k)$$

where $z_i(k)$=Element i of zigzag—vector of block k i=[1, 63]

k=Block number=[0, 1, 2, . . . ]

$l_{DC}(-1)=0$

For decompression the inverse level encoding is calculated as follows:

$$z_0(k)=l_{DC}(k)+l_{DC}(k-1)$$

$$z_i(k)=l_{AC,i}(k)$$

where $z_i(k)$=Element i of zigzag—vector of block k i=[1, 63]

k=Block number=[0, 1, 2, . . . ]

$l_{DC}(-1)=0$

An example of run-length encoding follows: a run-level-combination in this example is written as (r, 1), where r is the run-length of zeros and 1 is the level following the zeros. Let the input vector for the run-length-encoding be {−126, 26, 43, 2, 2, 1, 1, 0, 0, 0, 1, 0, 0, −1, −1, 0, 0, 0, 0, 0, . . . , 0} (64 values in total)

and the preceding DC term—119. The run-length-encoded data will then be (0, −7), (0, 26), (0, 43), (0, 2), (0, 2), (0, 1), (0, 1), (3, 1), (2, −1), (0, −1), (0, 0)

The two output vectors might then look like this (the grey values are values from the previous block):

{ . . . , 2, 4, 0, 23, 0, 0, 0, 0, 0, 0, 0, 0, 0, 3, 2, 0, 0} (run-vector) and

{ . . . , −1, 1, 2, −1, 0, −7, 26, 43, 2, 2, 1, 1, 1, −1, −1, 0} (level-vector)

After run-length-encoding, the run vector and the level vector are combined and entropy encoded by an entropy encoder as shown previously in FIG. 5*b*. This reduces the number of bits per pixel. Entropy encoding is done by means of a modified Huffman table for run-level-combinations that occur most frequently. The number of bits for the code used to represent frequent combinations is the lower the more frequent the run-level-combination occurs. To keep the image file size to a minimum, a fixed table is used. This table has been derived empirically from a large set of test images. For some images, dynamic Huffman code tables may lead to smaller file sizes, but in most cases the Huffman code table used in this embodiment of the invention will lead to smallest file sizes.

All run-level combinations are encoded using the following scheme:

If there is an entry in the Huffman code table for the run-level combination to encode, then the code from the table will be used. To encode positive and negative levels, a sign bit is put in front of the code taken from the table.

If there is no entry in the Huffman table for a certain run-level combination, then the following standard coding scheme has to be used.

Standard coding is achieved by setting the sign bit to 1, followed by one of two possible Escape (ESC1, ESC2) markers. The next 6 bits represent the run-length as unsigned binary code, and finally the level follows. The level will be encoded as signed binary code.

If the level within [−127, 127], the ESCL marker is used and the level is encoded using 8 bits.

If the level is within [−255, 255], the ESC2 marker is used and the level is encoded using 9 bits.

At this stage, the level cannot exceed [−255, 255], which is the reason why a maximum of 9 bits only is sufficient to encode the level. In fact, the largest absolute value of a coefficient will be even smaller than 200.

For the most common run-level combinations, a Huffman code as defined the following table is used. This table is sorted by run and level and can be used for the encoding. The encoder uses the run-level-combination to look up the corresponding Huffman code.

| Run | Level | Code length | Huffman code word | 16-bit code (bin.) |
|---|---|---|---|---|
| 0 | 1 | 2 | 11 | 0000 0000 0000 0011 |
| 0 | 2 | 4 | 0100 | 0000 0000 0000 0100 |
| 0 | 3 | 5 | 00101 | . |
| 0 | 4 | 7 | 0000110 | . |
| 0 | 5 | 8 | 00100110 | . |
| 0 | 6 | 8 | 00100001 | |
| 0 | 7 | 10 | 0000001010 | |
| 0 | 8 | 12 | 000000011101 | |
| 0 | 9 | 12 | 000000011000 | |
| 0 | 10 | 12 | 000000010011 | |
| 0 | 11 | 12 | 000000010000 | |
| 0 | 12 | 13 | 0000000011010 | |
| 0 | 13 | 13 | 0000000011001 | |
| 0 | 14 | 13 | 0000000011000 | |
| 0 | 15 | 13 | 0000000010111 | |
| 0 | 16 | 14 | 00000000011111 | |
| 0 | 17 | 14 | 00000000011110 | |
| 0 | 18 | 14 | 00000000011101 | |
| 0 | 19 | 14 | 00000000011100 | |
| 0 | 20 | 14 | 00000000011011 | |
| 0 | 21 | 14 | 00000000011010 | |
| 0 | 22 | 14 | 00000000011001 | |
| 0 | 23 | 14 | 00000000011000 | |
| 0 | 24 | 14 | 00000000010111 | |
| 0 | 25 | 14 | 00000000010110 | |
| 0 | 26 | 14 | 00000000010101 | |
| 0 | 27 | 14 | 00000000010100 | |
| 0 | 28 | 14 | 00000000010011 | |
| 0 | 29 | 14 | 00000000010010 | |
| 0 | 30 | 14 | 00000000010001 | |
| 0 | 31 | 14 | 00000000010000 | |
| 0 | 32 | 15 | 000000000011000 | |
| 0 | 33 | 15 | 000000000010111 | |
| 0 | 34 | 15 | 000000000010110 | |
| 0 | 35 | 15 | 000000000010101 | |
| 0 | 36 | 15 | 000000000010100 | |
| 0 | 37 | 15 | 000000000010011 | |
| 0 | 38 | 15 | 000000000010010 | |
| 0 | 39 | 15 | 000000000010001 | |
| 0 | 40 | 15 | 000000000010000 | |

The same formation is used for decoding of the image data. The above table is shown here sorted by code length. This table is used by the entropy decoder 60 (FIG. 6*b*), which uses the received code and its code length to look up the run-level-combination.

-continued

| Run | Level | Code length | Huffman code word | 16-bit code (bin.) |
|---|---|---|---|---|
| 1 | 1 | 3 | 011 | |
| 1 | 2 | 6 | 000110 | |
| 1 | 3 | 8 | 00100101 | |
| 1 | 4 | 10 | 0000001100 | |
| 1 | 5 | 12 | 000000011011 | |
| 1 | 6 | 13 | 0000000010110 | |
| 1 | 7 | 13 | 0000000010101 | |
| 1 | 8 | 15 | 000000000011111 | |
| 1 | 9 | 15 | 000000000011110 | |
| 1 | 10 | 15 | 000000000011101 | |
| 1 | 11 | 15 | 000000000011100 | |
| 1 | 12 | 15 | 000000000011011 | |
| 1 | 13 | 15 | 000000000011010 | |
| 1 | 14 | 15 | 000000000011001 | |
| 1 | 15 | 16 | 0000000000010011 | |
| 1 | 16 | 16 | 0000000000010010 | |
| 1 | 17 | 16 | 0000000000010001 | |
| 1 | 18 | 16 | 0000000000010000 | |
| 2 | 1 | 4 | 0101 | |
| 2 | 2 | 7 | 0000100 | |
| 2 | 3 | 10 | 0000001011 | |
| 2 | 4 | 12 | 000000010100 | |
| 2 | 5 | 13 | 0000000010100 | |
| 3 | 1 | 5 | 00111 | |
| 3 | 2 | 8 | 00100100 | |
| 3 | 3 | 12 | 000000011100 | |
| 3 | 4 | 13 | 0000000010011 | |
| 4 | 1 | 5 | 00110 | |
| 4 | 2 | 10 | 0000001111 | |
| 4 | 3 | 12 | 000000010010 | |
| 5 | 1 | 6 | 000101 | |
| 5 | 2 | 10 | 0000001001 | |
| 5 | 3 | 13 | 0000000010010 | |
| 6 | 1 | 6 | 000111 | |
| 6 | 2 | 12 | 000000011110 | |
| 6 | 3 | 16 | 0000000000010100 | |
| 7 | 1 | 6 | 000100 | |
| 7 | 2 | 12 | 000000010101 | |
| 8 | 1 | 7 | 0000111 | |
| 8 | 2 | 12 | 000000010001 | |
| 9 | 1 | 7 | 0000101 | |
| 9 | 2 | 14 | 00000000010001 | |
| 10 | 1 | 8 | 00100111 | |
| 10 | 2 | 13 | 0000000010000 | |
| 11 | 1 | 8 | 00100011 | |
| 11 | 2 | 16 | 0000000000011010 | |
| 12 | 1 | 8 | 00100010 | |
| 12 | 2 | 16 | 0000000000011001 | |
| 13 | 1 | 8 | 00100000 | |
| 13 | 2 | 16 | 0000000000011000 | |
| 14 | 1 | 10 | 0000001110 | |
| 14 | 2 | 16 | 0000000000010111 | |
| 15 | 1 | 10 | 0000001101 | |
| 15 | 2 | 16 | 0000000000010110 | |
| 16 | 1 | 10 | 0000001000 | |
| 16 | 2 | 16 | 0000000000010101 | |
| 17 | 1 | 12 | 000000011111 | |
| 18 | 1 | 12 | 000000011010 | |
| 19 | 1 | 12 | 000000011001 | |
| 20 | 1 | 12 | 000000010111 | |
| 21 | 1 | 12 | 000000010110 | |
| 22 | 1 | 13 | 0000000011111 | |
| 23 | 1 | 13 | 0000000011110 | |
| 24 | 1 | 13 | 0000000011101 | |
| 25 | 1 | 13 | 0000000011100 | |
| 26 | 1 | 13 | 0000000011011 | |
| 27 | 1 | 16 | 0000000000011111 | |
| 28 | 1 | 16 | 0000000000011110 | . |
| 29 | 1 | 16 | 0000000000011101 | . |
| 30 | 1 | 16 | 0000000000011100 | . |
| 31 | 1 | 16 | 0000000000011011 | 0000 0000 0001 1011 |
| EOB | S = 0 | 2 | 10 | Marker |
| ESC1 | S = 1 | 2 | 10 | Marker |
| ESC2 | S = 1 | 6 | 000001 | Marker |

| Run | Level | Code length | Huffman code word | 16-bit code (bin.) |
|---|---|---|---|---|
| 0 | 1 | 2 | 11 | 0000 0000 0000 0011 |
| EOB | S = 0 | 2 | 10 | Marker |
| ESC1 | S = 1 | 2 | 10 | Marker |
| 1 | 1 | 3 | 011 | 0000 0000 0000 0011 |
| 0 | 2 | 4 | 0100 | 0000 0000 0000 0100 |
| 2 | 1 | 4 | 0101 | . |
| 0 | 3 | 5 | 00101 | . |
| 3 | 1 | 5 | 00111 | . |
| 4 | 1 | 5 | 00110 | |
| 1 | 2 | 6 | 000110 | |
| 5 | 1 | 6 | 000101 | |
| 6 | 1 | 6 | 000111 | |
| 7 | 1 | 6 | 000100 | |
| ESC2 | S = 1 | 6 | 000001 | Marker |
| 0 | 4 | 7 | 0000110 | |
| 2 | 2 | 7 | 0000100 | |
| 8 | 1 | 7 | 0000111 | |
| 9 | 1 | 7 | 0000101 | |
| 0 | 5 | 8 | 00100110 | |
| 0 | 6 | 8 | 00100001 | |
| 1 | 3 | 8 | 00100101 | |
| 3 | 2 | 8 | 00100100 | |
| 10 | 1 | 8 | 00100111 | |
| 11 | 1 | 8 | 00100011 | |
| 12 | 1 | 8 | 00100010 | |
| 13 | 1 | 8 | 00100000 | |
| 0 | 7 | 10 | 0000001010 | |
| 1 | 4 | 10 | 0000001100 | |
| 2 | 3 | 10 | 0000001011 | |
| 4 | 2 | 10 | 0000001111 | |
| 5 | 2 | 10 | 0000001001 | |
| 14 | 1 | 10 | 0000001110 | |
| 15 | 1 | 10 | 0000001101 | |
| 16 | 1 | 10 | 0000001000 | |
| 0 | 8 | 12 | 000000011101 | |
| 0 | 9 | 12 | 000000011000 | |
| 0 | 10 | 12 | 000000010011 | |
| 0 | 11 | 12 | 000000010000 | |
| 1 | 5 | 12 | 000000011011 | |
| 2 | 4 | 12 | 000000010100 | |
| 3 | 3 | 12 | 000000011100 | |
| 4 | 3 | 12 | 000000010010 | |
| 6 | 2 | 12 | 000000011110 | |
| 7 | 2 | 12 | 000000010101 | |
| 8 | 2 | 12 | 000000010001 | |
| 17 | 1 | 12 | 000000011111 | |
| 18 | 1 | 12 | 000000011010 | |
| 19 | 1 | 12 | 000000011001 | |
| 20 | 1 | 12 | 000000010111 | |
| 21 | 1 | 12 | 000000010110 | |
| 0 | 12 | 13 | 0000000011010 | |
| 0 | 13 | 13 | 0000000011001 | |
| 0 | 14 | 13 | 0000000011000 | |
| 0 | 15 | 13 | 0000000010111 | |
| 1 | 6 | 13 | 0000000010110 | |
| 1 | 7 | 13 | 0000000010101 | |
| 2 | 5 | 13 | 0000000010100 | |
| 3 | 4 | 13 | 0000000010011 | |
| 5 | 3 | 13 | 0000000010010 | |
| 10 | 2 | 13 | 0000000010000 | |
| 22 | 1 | 13 | 0000000011111 | |
| 23 | 1 | 13 | 0000000011110 | |
| 24 | 1 | 13 | 0000000011101 | |
| 25 | 1 | 13 | 0000000011100 | |
| 26 | 1 | 13 | 0000000011011 | |
| 0 | 16 | 14 | 00000000011111 | |
| 0 | 17 | 14 | 00000000011110 | |
| 0 | 18 | 14 | 00000000011101 | |
| 0 | 19 | 14 | 00000000011100 | |

-continued

| Run | Level | Code length | Huffman code word | 16-bit code (bin.) |
|---|---|---|---|---|
| 0 | 20 | 14 | 00000000011011 | |
| 0 | 21 | 14 | 00000000011010 | |
| 0 | 22 | 14 | 00000000011001 | |
| 0 | 23 | 14 | 00000000011000 | |
| 0 | 24 | 14 | 00000000010111 | |
| 0 | 25 | 14 | 00000000010110 | |
| 0 | 26 | 14 | 00000000010101 | |
| 0 | 27 | 14 | 00000000010100 | |
| 0 | 28 | 14 | 00000000010011 | |
| 0 | 29 | 14 | 00000000010010 | |
| 0 | 30 | 14 | 00000000010001 | |
| 0 | 31 | 14 | 00000000010000 | |
| 9 | 2 | 14 | 00000000010001 | |
| 0 | 32 | 15 | 000000000011000 | |
| 0 | 33 | 15 | 000000000010111 | |
| 0 | 34 | 15 | 000000000010110 | |
| 0 | 35 | 15 | 000000000010101 | |
| 0 | 36 | 15 | 000000000010100 | |
| 0 | 37 | 15 | 000000000010011 | |
| 0 | 38 | 15 | 000000000010010 | |
| 0 | 39 | 15 | 000000000010001 | |
| 0 | 40 | 15 | 000000000010000 | |
| 1 | 8 | 15 | 000000000011111 | |
| 1 | 9 | 15 | 000000000011110 | |
| 1 | 10 | 15 | 000000000011101 | |
| 1 | 11 | 15 | 000000000011100 | |
| 1 | 12 | 15 | 000000000011011 | |
| 1 | 13 | 15 | 000000000011010 | |
| 1 | 14 | 15 | 000000000011001 | |
| 1 | 15 | 16 | 0000000000010011 | |
| 1 | 16 | 16 | 0000000000010010 | |
| 1 | 17 | 16 | 0000000000010001 | |
| 1 | 18 | 16 | 0000000000010000 | |
| 6 | 3 | 16 | 0000000000010100 | |
| 11 | 2 | 16 | 0000000000011010 | |
| 12 | 2 | 16 | 0000000000011001 | |
| 13 | 2 | 16 | 0000000000011000 | |
| 14 | 2 | 16 | 0000000000010111 | |
| 15 | 2 | 16 | 0000000000010110 | |
| 16 | 2 | 16 | 0000000000010101 | |
| 27 | 1 | 16 | 0000000000011111 | |
| 28 | 1 | 16 | 0000000000011110 | . |
| 29 | 1 | 16 | 0000000000011101 | . |
| 30 | 1 | 16 | 0000000000011100 | . |
| 31 | 1 | 16 | 0000000000011011 | 0000 0000 0001 1011 |

Some examples of Huffman code follow:

| Run, level | S | Huffman code/marker | Run | Level |
|---|---|---|---|---|
| (0, −130) | 1 | 0000001 (ESC2) | 000000 | 1 0111 1110 |
| (26, −127) | 1 | 10 (ESC1) | 011010 | 1000 0001 |
| (0, −1) | 1 | 11 | | |
| (0, 1) | 0 | 11 | | |
| (10, 1) | 0 | 0010 0111 | | |
| (0, 0) | 0 | 10 | | |

All components of images compressed by the method used in this embodiment of the invention are processed in bottom-up- left-to-right fashion. This means that the first block of a component is in the bottom-left corner of the input image, the next block is to its right, and so on until the end of the block line. The next block line is above the previous block lines and all block lines start at the left. This process is illustrated in FIG. 10.

As each block is treated individually until the Entropy encoding, there are many different ways of creating the block data stream. As there is no need for images to be decoded before actually receiving all image data, a non-interleaving structure has been chosen as it simplifies the algorithm and cuts down processing time. This means that all blocks of the Y component are processed and stored first, followed by all blocks for the Cb component and finally all blocks for the Cr component. A progressive de/encoding is also possible and is described later. The resulting data stream is illustrated in FIG. 11.

Images compressed by using the method of this invention are stored in this embodiment in the following file format (referred to here as VACIMG files).

This embodiment of the invention compresses images using a Visual Attention Map, which defines different regions in the image to compress with different level of interest. Four levels are used in this embodiment although more (or fewer) levels could be used as desired. Regions corresponding to each level of interest are compressed each with their own compression rate, thus allowing to compress the background with a higher compression rate (and lower quality) than other parts of the image. The compressed image is then stored in a file, which also includes the Visual Attention Map. As high compression rates are the one of the goals of this embodiment of the invention, only as little information about the image as necessary is stored in the file. All general information about the image comes first in the file, followed by the Visual Attention Map and then the compressed image data. The general information about the image consists of the number of samples in x- and y-direction and the levels of quality for all four possible levels. In order to allow applications to detect if a file is a VACIMG file, a file signature is inserted in front of the general image information.

The following table provides an overview of the file format used by VACIMG images.

| Byte number | Name | Length in bytes | Function |
|---|---|---|---|
| 0–5 | — | 6 | File signature: "VACIMG" |
| 6–7 | width | 2 | Number of samples in x-direction |
| 8–9 | height | 2 | Number of samples in y-direction |
| 10 | Level 0 | 1 | Quantization factor for level 0 (background) |
| 11 | Level 1 | 1 | Quantization factor for level 1 (foreground, low i.) |
| 12 | Level 2 | 1 | Quantization factor for level 2 (foreground, med. i.) |
| 13 | Level 3 | 1 | Quantization factor for level 3 (foreground, high i.) |
| 14–i | VA Map | k | Visual Attention Map |
| i–n | Data | d | Image data |

All bytes are written to the file using standard windows bit alignment in the bytes. The file starts with 6 bytes representing the characters 'V', 'A', 'C', 'I', 'M' and 'G'. Then the number of samples, width and height follow, which both are stored as unsigned 16-bit integer. The most significant byte comes first. This is followed by the four quality levels, which are stored as unsigned 8-bit integer number. Next comes the Visual Attention Map, VA Map, which stores the levels of interest (and thus the levels of compression). The Visual Attention Map is represented with two bits per 8×8-pixel-block. The number of blocks in x- and y-direction is given by the equation shown earlier, which is used to calculate the number of bytes used by the Visual Attention Map as follows.

$$k = \frac{bx_Y \cdot by_Y}{4}$$

Finally, all compressed image data follows. The number of bytes used for the compressed image data is unknown by the decoder. The decoder must use all bytes provided to reconstruct the image and terminate decoding automatically once the end of the file has been reached.

Using a Visual Attention Map allows progressive decoding of an image, in which the most interesting parts of the image are decoded first. Instead of using a non-interleaved structure to store DCT coefficients of the image components, an interleaved structure can be used so that all information to reconstruct a block is close together in the data stream. This allows the receiver to start decompressing and building up the received image before having received the complete file. This is extremely useful for technology such as the world wide web, wireless application protocol (WAP) phones or even videophones. JPEG already offers progressive encoding, but there are advantages that can be derived from using a Visual Attention based Image Compression. The blocks that are regarded as most important (level-3-blocks) can be sent first, followed by level-2-blocks, level-1-blocks and finally the background blocks (level-0-blocks). This means that the receiver will get the "message" of the image a lot earlier and he could even decide to cut off the data stream once enough information has been received. In most applications the image is sent in a fixed sequence of blocks, e.g. starting in the top right-hand corner and scanning the image downwards row-by-row. So in order to get the "message" of the image, you will have to wait until the whole image is transmitted and reconstructed. Using a Visual Attention Map would allow you to send the importantblocks first, followed by the next important blocks, and so on, so that you can cut off the data stream once there is enough information to get the message. This technique allows transmission of video streams, even in narrow bandwidth networks, with reasonable quality. In particular, for videophones, this technique will provide images at a lower bandwidth at the expense of losing some background information.

If the bandwidth is too narrow to transmit the whole image, the decoder and encoder can stop the transmission of blocks at any time, thus only transmitting the most important blocks. In order to get an improved image at the receiver, the whole image should be transmitted every so often to update the background as well. However, most of the time it is sufficient to replace the most important blocks only and to use background blocks of the previous image when they can not be replaced by new blocks.

It is also possible to automatically blur blocks which have been decoded with low levels of quantization due to a low visual attention level in the VA-map. This improves the perceptual quality of the decoded image with no storage or bandwidth overhead.

Other applications of the invention include the ergonomic considerations in the design and location of warning signs (e.g. road signs) in order to render them conspicuous which is often a process of trial and error, with risk to the public during this phase. An objective measure of visual attention (in other words, identifying whether the sign, or something else, is the principal subject in the intended audience's view of the sign in its proposed environment) would improve the design process and reduce the risk of accidents caused by insufficiently conspicuous experimental signs. The visual impact of other signs, such as advertisements, and the layout of display screens such as Internet "Websites", can also be optimised using this process to maximise visual attention in specific locations.

The invention would also be capable of identifying objects that are different in some respect from the background or surrounding population. For example, a cancerous cell may be identified by its possession of features not present in the surrounding healthy cells. The identification of such anomalies by eye is currently a very labour-intensive process, because of the large number of samples to be inspected and the comparative rarity of cancerous cells. Human observers have been known to fail to notice anomalous cells as a result of eye strain and fatigue.

As another example, in bubble chamber photographs used by particle physicists, new and anomalous patterns of particle tracks may be identified by this process. Since the tracks of most interest are those generated by hitherto undiscovered particles with unknown properties, it is not possible to devise a template to search for them.

As a farther example, the objective detection of defects in visual representations of textures would improve quality assurance of manufacturing processes of fabrics, microchip layouts and other processes where surface defects are to be avoided.

In another application recognition of the presence of objects that do not match their surroundings has many applications in the field of security surveillance. Such objects may constitute a serious hazard if not brought to the early attention of security personnel. Similarly, anomalous objects present in satellite images may reveal valuable intelligence information or local changes in the ecology.

The invention may also serve as a model of human visual perception with application to a range of tasks in which it is required to emulate human performance as a substitute for lengthy and expensive human factors trials.

Other areas in which the invention may find applications include improved rendering for video material in which areas of perceptual importance are rendered with more detail, enhancement of teaching material to focus students' attention, in image editing providing an outline for objects of high attention, so that they may be cut and used for composites, for example, and in automated checking of safety signals/signs on railways and roads through automated monitoring of visual attention levels.

What is claimed is:

1. A method of processing visual image, for identifying areas of visual attention, comprising:

storing an image as an array of pixels, each pixel having a value;

selecting test pixels from the array;

for each text pixel;

selecting one or more neighbor groups of pixels neighboring the test pixel;

selecting comparison pixels from the array;

identifying a group of pixels neighboring a selected comparison pixel having the same respective positional relationships to the comparison pixel as a selected neighbor group of pixels has to the test pixel;

comparing the values of the selected neighbor group with the values of the identified group in accordance with a predetermined match criterion, and generating a measure of visual attention for each test pixel, in dependence upon the number of comparisons made for that test pixel for which the comparison results in a mismatch.

2. A method as in claim 1 wherein, for each test pixel, if one or more of the selected pixels neighboring the test pixel has a value not substantially similar to the value of the corresponding pixel neighboring the comparison pixel, an anomaly value for that test pixel is incremented, and this process is repeated using further comparison pixels with the same test pixel until a comparison pixel is selected for which all the selected pixels have a value substantially similar to the corresponding pixel neighboring the text pixel, in which case a further neighbor group is selected and the process repeated.

3. A method as in claim 1, wherein a plurality of test pixels are analyzed concurrently.

4. A method as in claim 1, wherein a plurality of comparison pixels are compared with a given test pixel concurrently.

5. A method as in claim 1, wherein the value is a three-element vector representative of a color.

6. A method as in claim 1, wherein in addition to neighbor groups, further variable search parameters are selected.

7. A method as in claim 6, wherein the further variable search parameters include a threshold value for the determination of whether two pixel values are substantially similar.

8. A method as in claim 1, the method including storing values for search parameters for which a large number of mismatches has been generated, and selecting, for subsequent test pixels, the same search parameters.

9. A method as in claim 1, wherein the principal subject in a visual scene is identified by identification of the region containing pixels having the largest number of mismatches.

10. A method as in claim 1, wherein a measure of visual attention afforded to a given object in a visual scene is determined by comparison of anomaly values generated for the pixels representing that object with anomaly values generated for other parts of the scene.

11. A method of image compression comprising:
processing an image to locate areas of visual attention using the method of claim 1; and
coding the image according to the measures of visual attention such that areas of high visual attention are coded with more accuracy than areas of the image with low visual attention.

12. A method of image compression as in claim 11 in which the measures of visual attention are used to select a level of quantization for coding the image.

13. Apparatus for processing a visual image, for locating areas of visual attention, said apparatus comprising:
means for storing an image as an array of pixels, each pixel having a value;
means for selecting test pixels from the array,
means for selecting neighbor groups of pixels neighboring the test pixel;
means for selecting comparison pixels from the array;
means for identifying that group of pixels neighboring a selected comparison pixel whose pixels have the same respective positional relationships to the comparison pixel as a selected neighbor group of pixels has to the test pixel;
means for comparing the values of the selected neighbor group with the values of the identified group in accordance with a predetermined match criterion,
means for generating a measure of visual attention for each test pixel, in dependence upon the number of comparisons which identify a non-matching group.

14. A computer programmed to perform the method of claim 1.

15. A computer program product stored on a computer readable medium, directly loadable into the internal memory of a digital computer, comprising software code portions for performing the steps of claim 1 when said product is run on a computer.

16. A computer program product stored on a computer usable medium, said product comprising:
at least one computer readable program configured for causing a computer to store an image as an array of pixels, each pixel having a value;
at least one computer readable program configured for causing the computer to select test pixels from the array,
at least one computer readable program configured for causing the computer to select, for each test pixel, neighbor groups of pixels neighboring the test pixel;
at least one computer readable program configured for causing the computer to select comparison pixels from the array;
at least one computer readable program configured for causing the computer to identify the group of pixels neighboring a selected comparison pixel having the same respective positional relationships to the comparison pixel as a selected neighbor group of pixels has to the test pixel;
at least one computer readable program configured for causing the computer to compare the values of the selected neighbor group with the values of the identified group in accordance with a predetermined match criterion; and
at least one computer readable program configured for causing the computer to generate a measure of visual attention for each test pixel, in dependence upon the number of comparisons in which the comparison result in a mismatch.

17. A method of processing a sequence of visual images, for identifying areas of visual attention, said method comprising:
storing a sequence of images as a multi dimensional array of pixels, each pixel having a value;
selecting test pixels from the array;
for each test pixel, selecting one or more neighbor groups of pixels neighboring the test pixel;
selecting comparison pixels from the array;
identifying a group of pixels neighboring a selected comparison pixel having the same respective positional relationships to the comparison pixel as a selected neighbor group of pixels has to the test pixel;
comparing the values of the selected neighbor group with the values of the identified group in accordance with a predetermined match criterion; and
generating a measure of visual attention for each test pixel, in dependence upon the number of comparisons made for that test pixel for which the comparison results in a mismatch.

18. A method of processing a moving image, for identifying areas of visual attention, said method comprising:
storing successive pictures of the moving image as respective arrays of picture element values;
defining a test group of picture elements comprising a first test picture element and a second test picture element having a spatial offset and a temporal offset from the first;
defining a comparison group of picture elements comprising a first comparison picture element having a spatial and temporal offset from the first test picture element and a second comparison picture element having a spatial and temporal offset from the first comparison picture element equal respectively to the spatial and temporal offset of the second test picture element from the first test picture element;

comparing the picture element values of the first and second test picture elements with the picture element values of the first and second comparison picture elements respectively, in accordance with a predetermined match criterion;

defining further such comparison groups and comparing the test picture elements with those of the further comparison groups;

generating a visual attention measure for the first test picture element in dependence on the number of comparisons made for it in which the comparison results in a mismatch.

19. A method as in claim 18 further including:

defining at least one further comparison group comprising a first further comparison element having the same spatial offset from the first test picture element as has the first comparison picture element, but a different temporal offset, and a second further comparison picture element having the same offset from the first further comparison picture element as the second test picture element has from the first test picture element, and wherein the comparing step includes comparing value of the first and second further comparison picture elements with the values of the first and second test picture elements respectively.

20. A method as in claim 18 in which the test group and each comparison group includes at least one additional picture element.

21. A method as in claim 1 further comprising:

defining a subset of said pixel array and generating said measure of visual attention in respect of test pixels in said subset.

22. A method as in claim 21, further comprising:

identifying one or more of said test pixels for which said measure is indicative of a large number of mismatches relative to the measures generated for others of said test pixels; and generating said measures for further test pixels in the vicinity of said one or more identified test pixels.

23. A method of analyzing a pattern represented by an ordered set of elements each having a value comprising, in respect of at least some of said elements:

selecting a group of test elements comprising at least two elements of the ordered set;

selecting a group of comparison elements comprising at least two elements of the ordered set, wherein the comparison group has the same number of elements as the test group and wherein the elements of the comparison group have relative to one another the same positions in the ordered set as have the elements of the test group;

comparing the value of each element of the test group with the value of the correspondingly positioned element of the comparison group in accordance with a predetermined match criterion to produce a decision that the test group matches or does not match the comparison group;

selecting further said comparison groups and comparing them with the test group; and generating for the test group a distinctiveness measure a function of the number of comparison groups for which the decision is that the test group does not match the comparison group.

24. A method as in claim 1 further including:

(a) identifying ones of said positional relationship which give rise to a number of consecutive mismatches which exceeds a threshold;

(b) storing a definition of each such identified relationship; and (c) utilizing the stored definitions for the processing of further test pixels.

* * * * *